US011904368B2

(12) United States Patent
Van Pottelbergh et al.

(10) Patent No.: US 11,904,368 B2
(45) Date of Patent: Feb. 20, 2024

(54) DEVICE AND METHOD FOR CLEANING CONTAINERS

(71) Applicant: LVP Engineering & Constructions BV, Temse (BE)

(72) Inventors: Erik Van Pottelbergh, Sint-Niklaas (BE); Wouter Van Troos, Lokeren (BE)

(73) Assignee: LVP Engineering & Constructions BV, Temse (BE)

( * ) Notice: Subject to any disclaimer, the term of this patent is extended or adjusted under 35 U.S.C. 154(b) by 533 days.

(21) Appl. No.: 17/121,531

(22) Filed: Dec. 14, 2020

(65) Prior Publication Data

US 2021/0178434 A1 Jun. 17, 2021

(30) Foreign Application Priority Data

Dec. 16, 2019 (EP) .................................... 19216565

(51) Int. Cl.
*B08B 9/28* (2006.01)
*B08B 9/34* (2006.01)
*B08B 5/02* (2006.01)

(52) U.S. Cl.
CPC ................ *B08B 9/34* (2013.01); *B08B 9/283* (2013.01); *B08B 5/02* (2013.01)

(58) Field of Classification Search
CPC .. B08B 9/34; B08B 9/283; B08B 9/03; B08B 9/0813; B08B 9/0936; B08B 9/093; B08B 5/02; B08B 3/02; B08B 3/024; B25J 11/0085; B25J 15/0019; B25J 15/00
See application file for complete search history.

(56) References Cited

U.S. PATENT DOCUMENTS 6,248,177 B1 * 6/2001 Halbmaier ........ H01L 21/67051 134/22.12
6,292,976 B1 * 9/2001 Kurcz ..................... B08B 1/008 15/97.1
7,021,323 B1 * 4/2006 Ishikawa ................ B08B 9/093 134/102.1

(Continued)

FOREIGN PATENT DOCUMENTS

CN 109351731 A * 2/2019 ............. B08B 9/087
DE 102012024887 A1 6/2014

(Continued)

OTHER PUBLICATIONS

EP Search Report and Written Opinion received in EP19216565.2, dated Jul. 8, 2020.

*Primary Examiner* — Joseph L. Perrin
*Assistant Examiner* — Irina Graf
(74) *Attorney, Agent, or Firm* — Knobbe, Martens, Olson & Bear, LLP

(57) ABSTRACT

Cleaning arms for cleaning containers are disclosed that can be used for transportation of food, medical, and/or pharmaceutical products. In some embodiments, a container cleaning arm comprises a main body and rotatable head for cleaning a container interior surface. The main body comprises a proximate end configured for engaging with a motorized drive and a distal end rotatably coupled to the rotatable head. The rotatable head comprises a first washing nozzle or group of washing nozzles and a first air knife dryer positioned adjacent to the first group of washing nozzles.

20 Claims, 15 Drawing Sheets

(56) References Cited

U.S. PATENT DOCUMENTS

| | | | | |
|---|---|---|---|---|
| 2002/0100495 | A1* | 8/2002 | Bexten | H01L 21/67051 134/36 |
| 2004/0200509 | A1* | 10/2004 | Felder | B08B 9/093 134/32 |
| 2006/0180181 | A1* | 8/2006 | Stockert | B08B 3/02 134/143 |
| 2013/0167875 | A1* | 7/2013 | Clusserath | B25J 11/0085 134/133 |
| 2016/0368032 | A1 | 12/2016 | Hull | |
| 2017/0326737 | A1* | 11/2017 | Martin | B25J 18/025 |
| 2018/0015907 | A1* | 1/2018 | Rice | B60S 1/56 |
| 2018/0265048 | A1* | 9/2018 | Schmidt | B08B 5/02 |
| 2019/0023234 | A1* | 1/2019 | Young | B60S 3/008 |

FOREIGN PATENT DOCUMENTS

| | | | | | |
|---|---|---|---|---|---|
| EP | 0256699 | A2 | | 2/1988 | |
| EP | 3081887 | | | 10/2016 | |
| JP | H07-000550 | U | | 1/1995 | |
| JP | H10-034094 | A | | 2/1998 | |
| JP | 2006-314898 | A | | 11/2006 | |
| KR | 101265182 | B1 | * | 5/2013 | B08B 9/093 |
| WO | WO-2006099680 | A1 | * | 9/2006 | B08B 9/0936 |
| WO | WO-2012022881 | A1 | * | 2/2012 | B08B 3/003 |

* cited by examiner

DEVICE AND METHOD FOR CLEANING CONTAINERS

CROSS REFERENCE TO RELATED APPLICATIONS

This application claims the benefit of European Patent Application No. EP19216565.2, filed Dec. 16, 2019. Any and all applications for which a foreign or domestic priority claim is identified here or in the Application Data Sheet as filed with the present application are hereby incorporated by reference under 37 CFR 1.57.

FIELD

The present invention provides a cleaning arm for cleaning containers that are used for transporting of food, medical and pharmaceutical products. Further, a cleaning installation comprising said cleaning arm is provided. Additionally, methods for cleaning containers are also provided.

BACKGROUND

Thermally insulated shipping containers are used for shipping products like pharmaceuticals, chemicals, and fresh foods. Their insulated structure is necessary for maintaining the cold chain during transport. Cold chain is a temperature-controlled supply-chain in which the temperature of goods is continually kept within a constant low-temperature range. In many industries, such as the food, medical and pharmaceutical industry, an unbroken cold chain is essential for ensuring and/or extending the shelf life of products that are not heat stable.

To abide with strict (e.g. food or pharma) safety regulations, the containers should be cleaned on a regular basis, which may be as frequent as after every shipping cycle. The typical container cleaning process starts with a thorough washing step using cleaning agents to sanitize the container inside, this may be followed by an optional rinsing step in order to remove the remaining cleaning agents, and ends with a drying step to prepare the container for transport. The drying step is particularly important because of the cold temperatures used in cold chain, which may cause any remaining cleaning agent to freeze and form ice on the container walls or along the transport line.

In state-of-the-art systems the washing and drying steps are performed in separate locations, wherein the interior of the container is first sanitised using a washing installation, after which the container is transported to a drying installation. The transport can be performed manually, but can also be automated, for instance by means of a conveyor belt. Such 'separated' cleaning systems have various disadvantages: such as needing a longer time to clean the container, increasing the total size and operative cost of the cleaning installation, reducing the efficiency of the cleaning process, and requiring more maintenance and operators (e.g. engineers, cleaners). Moreover, also the reclaiming and recycling of used water becomes more difficult, since it must be collected from multiple often spread-out locations, and it may also drip out from the wet container during transport. Considering that typical cleaning installations easily handle hundreds of containers daily, the lost time and resources quickly add up.

Therefore, there is a need for washing and drying (insulated) containers speedily, and in an energy efficient way, at low temperatures, preferably slightly above 0° C. Preferably, washing the containers occurs without excessive water loss, while still keeping clean and sanitized water, and/or requiring little to no maintenance.

SUMMARY

The present invention provides a cleaning arm for cleaning containers that are mainly used for transporting of food, medical and pharmaceutical products. Further, a cleaning installation comprising said cleaning arm is provided. Additionally, methods for cleaning containers are also provided. The present cleaning arm, cleaning installation and cleaning methods may allow for combining of washing and drying cycles, which are typically performed separately in state-of-the-art systems, into a single cleaning cycle. At least part of the washing and drying cycles may performed in tandem, i.e. at least partially simultaneously or are at the very least performed in close time proximity to each other, without the need for transporting the container between the washing and the drying steps, for example transporting from a washing installation to a drying installation.

As a result of this combination, the present invention may provide for a more effective, efficient, user-friendly and/or faster way for cleaning containers. In particular, the present invention may improve the washing results, because the washing means (e.g. washing nozzles) can be steered to move along the container inside, thereby washing the container inside surface at an optimal (closer) distance, reducing the chance to miss a spot, and reaching the harder to clean (inside) corner areas. In state of art device the washing means are typically operated from a non-moveable position, e.g. being mounted outside of the container, thereby spraying the cleaning agent into the container inside from a greater distance, leading to varying (sub-optimal) cleaning result washing result and greatly increasing the chance of missed spots. Further, the present invention may improve the drying results, because the cleaning agent can be removed immediately or very quickly after washing, such that the cleaning agent cannot run along the washed surface, and/or the wet container surface cannot stagnate and grow contaminants (e.g. pathogens and microorganisms). Further, the present invention may improve the reclaiming and recycling of cleaning agent, in particular water, since the area flooded by the cleaning agent is reduced in size, any dripping water can be more easily captured and guided to filtering devices. Further still, the present invention may improve the safety of operators by reducing the area flooded with cold water, and/or by preventing cleaning agent from dripping down from the wet container, by preventing ice build-up on the wet container or along the installation (e.g. along the conveyor belt), or by preventing the occurrence of other health hazards (e.g. wet feet, slipping). Further still, the present invention may reduce the installation size, which in turn may reduce the working area and maintenance requirements of the installation. Further still, the present invention may reduce the number of operators required for cleaning of containers, since a single operator may perform the full cleaning cycle, or alternatively, it may enable easier automation of the cleaning process.

In a first aspect, the present invention relates to a container cleaning arm comprising—a main body and rotatable head for cleaning a container interior surface; the main body having a proximate end, which is configured for engaging with a drive means, and a distal end, which is rotatably coupled to the rotatable head; the rotatable head comprising a first washing nozzle or group of washing nozzles, preferably arranged in a line, and a first air knife dryer positioned adjacent to the first group of washing nozzles; and, the cleaning arm further comprising a fluid conduit for conveying cleaning agent to the washing nozzles, and an air conduit for delivering drying air to the air knife dryers, wherein the fluid and air conduits are disposed at least partially, preferably completely, within the cleaning arm for cleaning the container.

In some embodiments, the rotatable head comprises a second washing nozzle or group of washing nozzles, preferably arranged in a line, and second air knife dryer provided adjacent to the second group of washing nozzles.

In some embodiments, the first group of washing nozzles and air knife dryer are disposed at an angle relative to the second group of washing nozzles and air knife dryer, such that a first surface area cleaned by the first group of washing nozzles and air knife dryer does not overlap with a second surface area cleaned by the second group of washing nozzles and air knife dryer.

In some embodiments, the angle between the first group of washing nozzles and the second group of washing nozzles is at least 25° to at most 155°, preferably 55° to 125°, more preferably 70° to 110°, even more preferably 80° to 100°.

In some embodiments, the angle between the first air knife dryer and the second air knife dryer is at least 25° to at most 155°, preferably 55° to 125°, more preferably 70° to 110°, even more preferably 80° to 100°.

In some embodiments, the main body comprises a third washing nozzle or group of washing nozzles, preferably provided on opposite sides of the main body and/or arranged in a line along a longitudinal direction of the main body, and a third air knife dryer and a fourth air knife dryer, preferably provided on opposite sidewalls of the main body.

In some embodiments, the main body comprises a fourth washing nozzle or group of washing nozzles provided near at least one corner of the main body, preferably near both corners of the main body, preferably near the distal end of the main body.

In some embodiments, the cleaning arm comprises an essentially L-shaped extension for cleaning a container door interior surface; the L-shaped extension comprising an elongated body having a proximate end, which is attachable to the main body, and a distal end; and, the elongated body comprising a fifth washing nozzle or group of washing nozzles, preferably arranged in a line along a longitudinal direction of the elongated body, and a fifth air knife dryer, preferably provided on a sidewall of the elongated body.

In some embodiments, the distal end of the elongated body is provided with two divergently arranged side members forming an essentially Y-shaped extension for cleaning a container door interior top and side surfaces, the two side members comprising: a first side member comprising a sixth washing nozzle or group of washing nozzle, preferably provided near a terminal portion of said side member, and a sixth air knife dryer, preferably provided on a sidewall of the first side member; and, a second side member comprising a seventh air knife dryer, preferably provided on a sidewall of the second side member.

In some embodiments, the cleaning arm comprises a fluid collector disposed at least partially, preferably completely, within the cleaning arm; the fluid collector having an inlet for receiving cleaning agent, and at least one outlet provided with a controllable valve configured for selectively sending cleaning agent to a washing nozzle or washing nozzle group from the following list: first washing nozzle or group of washing nozzles, second washing nozzle or group of washing nozzles, third washing nozzle or group of washing nozzles, fourth washing nozzle or group of washing nozzles, fifth washing nozzle or group of washing nozzles, and/or sixth washing nozzle or group of washing nozzles.

In some embodiments, the cleaning arm comprises a shut-off valve configured for selectively shutting off the third air knife dryer and/or the fourth air knife dryer; preferably by blocking the flow of drying air into the third knife dryer and/or the fourth air knife dryer.

In some embodiments, the cleaning arm comprises a switching valve configured for selectively switching between the sixth air knife dryer and the seventh air knife dryer; preferably by selectively blocking the flow of drying air into the sixth air knife dryer or the seventh air knife dryer.

In some embodiments, the switching valve is operatively connected to a controllable valve configured for selectively sending cleaning agent to the sixth washing nozzle or group of washing nozzles, such that a flow of cleaning agent to the sixth washing nozzle opens a flow of drying air into the sixth air knife dryer and blocks a flow of drying air into the seventh air knife dryer.

In a further aspect, the present invention relates to a container cleaning installation for cleaning containers, comprising: a cleaning arm according to one or a combination of embodiments as described herein; a drive means for driving the cleaning arm's movement; a water supply source for providing cleaning agent; and, an air supply source for providing drying air, preferably comprising an air blower.

In some embodiments, the container cleaning installation comprises a transportation means for transporting containers, preferably comprising a chain conveyor belt and at least one mechanical stopper.

In some embodiments, the container cleaning installation comprises a container cover for covering at least part of a container exterior surface, preferably comprising a container bottom cover.

In some embodiments, the container cleaning installation comprises a water collecting and recycling system, preferably comprising a filtering device and/or a purification device; and/or a water feed.

In a further aspect, the present invention relates to a method for cleaning a container with a cleaning arm as described herein, the method comprising the steps of: washing the container by spraying cleaning agent from at least one washing nozzle or group of washing nozzles onto a container surface; and, drying the container by blowing drying air from at least one air knife dryer; wherein the washing and drying of the container are performed in tandem.

In some embodiments, the at least one air knife dryer may be positioned adjacent to the at least one washing nozzle or group of washing nozzles, such that the container surface may be dried immediately after washing.

In a further aspect, the present invention relates to a use of a cleaning arm according to one or a combination of embodiments as described herein for cleaning a container, preferably an interior of the container.

In a further aspect, the present invention relates to a use of a container cleaning installation according to one or a combination of embodiments as described herein for cleaning a container, preferably an interior of the container.

BRIEF DESCRIPTION OF THE DRAWINGS

The following description of the figures of specific embodiments of the invention is merely exemplary in nature and is not intended to limit the present teachings, their application or uses. Throughout the drawings, the corresponding reference numerals indicate the following parts and features: (10) device for cleaning containers; (100) cleaning arm main body; (150) shut-off valve; (200) cleaning arm rotatable head; (300) L-shaped extension; (350) Y-shaped extension; (400) water supply source; (412) first selective valve; (421) second selective valve; (431) third selective valve; (441) fourth selective valve; (450) rotary valve; (460) fluid collector; (512) first air knife dryer; (522) second air knife dryer; (531) third air knife dryer; (541) fourth air knife dryer; (553) fifth air knife dryer; (563) sixth air knife dryer; (573) seventh air knife dryer; (612) first nozzle or group of nozzles; (622) second nozzle or group of nozzles; (631) third nozzle or group of nozzles; (641) fourth nozzle or group of nozzles; (653) fifth nozzle or group of nozzles; (663) sixth nozzle or group of nozzles; (700) air supply source; (800) container cleaning installation; (810) chain conveyor belt; (830) water supply valve rack; (850) water collecting and recycling system; (900) container; (910) container interior surface; (911) container interior back surface; (913) container interior side surface; (915) container interior top surface; (917) container interior bottom surface; (920) container door interior surface; (925) container door interior top surface.

DETAILED DESCRIPTION

Figure 1:
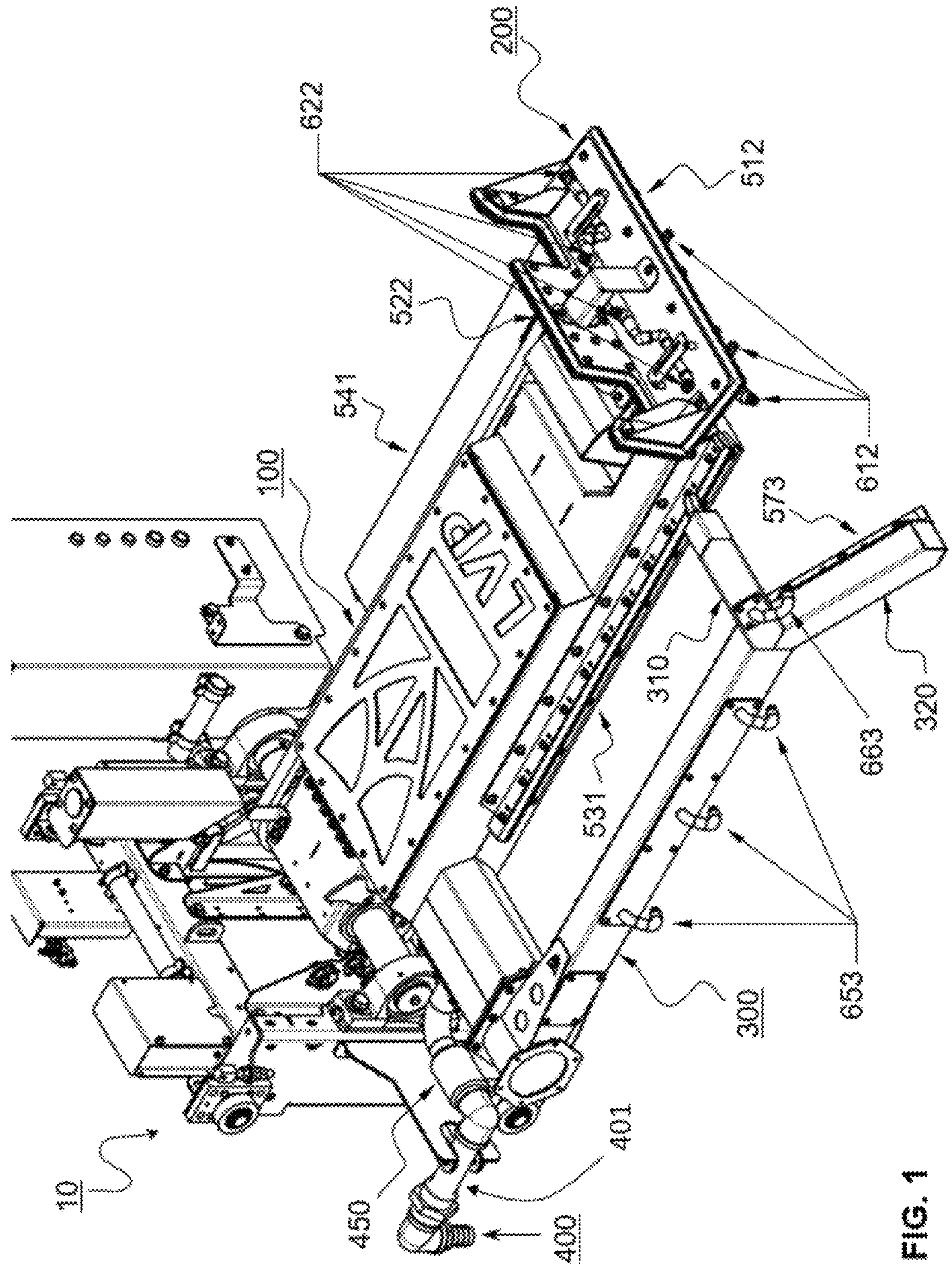
FIG. 1 is a top perspective view of a cleaning arm (10) according to a preferred embodiment of the present invention.

The present invention will be described with respect to particular embodiments, but the invention is not limited thereto but only by the claims. Any reference signs in the claims shall not be construed as limiting the scope thereof.

As used herein, the singular forms "a", "an", and "the" include both singular and plural referents unless the context clearly dictates otherwise.

The terms "comprising", "comprises" and "comprised of" as used herein are synonymous with "including", "includes" or "containing", "contains", and are inclusive or open-ended and do not exclude additional, non-recited members, elements or method steps. The terms "comprising", "comprises" and "comprised of" when referring to recited members, elements or method steps also include embodiments which "consist of" said recited members, elements, or method steps. Furthermore, the terms first, second, third and the like in the description and in the claims, are used for distinguishing between similar elements and not necessarily for describing a sequential or chronological order, unless specified. It is to be understood that the terms so used are interchangeable under appropriate circumstances and that the embodiments of the invention described herein are capable of operation in other sequences than described or illustrated herein.

The term "about" as used herein when referring to a measurable value such as a parameter, an amount, a temporal duration, and the like, is meant to encompass variations of +/−10% or less, preferably +/−5% or less, more preferably +1-1% or less, and still more preferably +/−0.1% or less of and from the specified value, insofar such variations are appropriate to perform in the disclosed invention. It is to be understood that the value to which the modifier "about" refers is itself also specifically, and preferably, disclosed.

The recitation of numerical ranges by endpoints includes all numbers and fractions subsumed within the respective ranges, as well as the recited endpoints.

All documents cited in the present specification are hereby incorporated by reference in their entirety.

Unless otherwise defined, all terms used in disclosing the invention, including technical and scientific terms, have the meaning as commonly understood by one of ordinary skill in the art to which this invention belongs. By means of further guidance, definitions for the terms used in the description are included to better appreciate the teaching of the present invention. The terms or definitions used herein are provided solely to aid in the understanding of the invention.

Reference throughout this specification to "one embodiment" or "an embodiment" means that a particular feature, structure, or characteristic described in connection with the embodiment is included in at least one embodiment of the present invention. Thus, appearances of the phrases "in one embodiment" or "in an embodiment" in various places throughout this specification are not necessarily all referring to the same embodiment but may. Furthermore, the particular features, structures or characteristics may be combined in any suitable manner, as would be apparent to a person skilled in the art from this disclosure, in one or more embodiments. Furthermore, while some embodiments described herein include some but not other features included in other embodiments, combinations of features of different embodiments are meant to be within the scope of the invention, and form different embodiments, as would be understood by those in the art. For example, in the following claims and description, any of the claimed or described embodiments can be used in any combination.

The present invention in a first aspect generally relates to a container cleaning arm for cleaning the interior or inside surface of a container. Optionally, the cleaning arm may be used or modified for cleaning the exterior or outside surface of a container. Cleaning of a container refers to a combination of washing and drying steps performed on at least a part of the container, preferably on at least a part of the inside surface of the container. Washing refers to a cleaning step wherein contaminants or leftover shipping goods are removed using a cleaning agent. The cleaning agent may be sprayed onto the container surface to (forcefully) remove the contaminants; the cleaning agent is preferably supplied under (high) pressure. The cleaning agent may typically consist of water, optionally mixed with one or more commercial cleaning products, such as detergent or disinfectants, forming an aqueous cleaning solution. The washing may further include a rinsing step to remove any cleaning agent residues. Drying refers to a cleaning step wherein leftover cleaning agent is (forcefully) removed. The agent may for instance be blown-off using (compressed) air supplied under (high) pressure. After fully undergoing the necessary washing and drying cycles the container may be referred to as a cleaned container.

As a result of this combination, the cleaning arm may provide for a more effective, efficient, user-friendly and/or faster way for cleaning containers. In particular, the cleaning arm may improve the washing results, because the washing means (e.g. washing nozzles) can be steered to move along the container inside, thereby washing the container inside surface at an optimal (closer) distance, reducing the chance to miss a spot, and reaching the harder to clean (inside) corner areas. In state of art device the washing means are typically operated from a non-moveable position, e.g. being mounted outside of the container, thereby spraying the cleaning agent into the container inside from a greater distance, leading to varying (sub-optimal) cleaning result washing result and greatly increasing the chance of missed spots. Further, the cleaning arm may improve the drying results, because the cleaning agent can be removed immediately or very quickly after washing, such that the cleaning agent cannot run along the washed surface, and/or the wet container surface cannot stagnate and grow contaminants (e.g. pathogens and microorganisms). Further, the cleaning arm may improve the reclaiming and recycling of cleaning agent, in particular water, since the area flooded by the cleaning agent is reduced in size, any dripping water can be more easily captured and guided to filtering devices. Further still, the cleaning arm may improve the safety of operators by reducing the area flooded with cold water, and/or by preventing cleaning agent from dripping down from the wet container, by preventing ice build-up on the wet container or along the installation (e.g. along the conveyor belt), or by preventing the occurrence of other health hazards (e.g. wet feet, slipping). Further still, the cleaning arm may reduce the installation size, which in turn may reduce the working area and maintenance requirements of the installation. Further still, the cleaning arm may reduce the number of operators required for cleaning of containers, since a single operator may perform the full cleaning cycle, or alternatively, it may enable easier automation of the cleaning process. The cleanable container is preferably an insulated shipping container typically used for shipping heat sensitive products, such as pharmaceuticals, chemicals, and fresh foods. The (insulated) containers may comprise one or more hooks for holding ice packs or other cooling means. The inside surface of a typical (insulated) containers may have a top surface, a back surface, a bottom surface, two side surfaces or sidewalls, and further also a front surface consisting of an openable container door provided with a closing means, the container door having a top and a bottom part. The container door is preferably fully opened during cleaning such that their interior hull may be easily reached for cleaning. An exemplary (insulated) container can have a substantially rectangular base area with sides of approximately 1200 mm by 800 mm, which roughly corresponds with the dimensions of euro pallets. The height of the exemplary (insulated) containers can vary between approximately 1750 mm and 2150 mm. The cleaning arm may, however, be easily modified for cleaning other types of containers having other dimensions.

The cleaning arm may comprise a main body and a rotatable head, which are configured for cleaning a container's inside surface;

- the main body having a proximate end, which is configured for engaging with a drive means, and a distal end, which is rotatably coupled to the rotatable head;
- the rotatable head comprising a first washing nozzle or group of washing nozzles, preferably arranged in a line, and a first air knife dryer positioned adjacent to the first group of washing nozzles;
- the cleaning arm further comprising a fluid conduit for conveying cleaning agent to the washing nozzles, and an air conduit for delivering drying air to the air knife dryers, wherein the fluid and air conduits are disposed at least partially, preferably completely, within the cleaning arm.

The rotatable head may comprise a second washing nozzle or group of washing nozzles, preferably arranged in a line, and second air knife dryer provided adjacent to the second group of washing nozzles. The second group of washing nozzles may be disposed at an angle relative to the first group of washing nozzles, such that a first surface area of the container interior surface washed by the first group of washing nozzles does not overlap or at the very least minimally overlaps with a second surface area of the container interior surface cleaned by the second group of washing nozzles. Also, the second air knife dryer may be disposed at an angle relative to the first air knife dryer, such that a first surface area of the container interior surface dried by the first air knife dryer does not overlap or at the very least minimally overlaps with a second surface area of the container interior surface dried by the second air knife dryer.

Preferably, the angle between the first group of washing nozzles and the second group of washing nozzles is at least 25° to at most 155°, more preferably 45° to at most 135°, more preferably 55° to 125°, even more preferably 65° to 105°, even more preferably 70° to 110°, even more preferably 75° to 105°, even more preferably 80° to 100°, even more preferably 75° to 95°, even more preferably about 90°. The angular difference between washing nozzles may be measured from the perpendicular to the washing nozzle surface, such as the washing nozzle tip.

In the specific scenario of a washing nozzle group having multiple washing nozzles directed at different angles, the angular difference is determined from the averaged perpendicular of every washing nozzle surface or the perpendicular to the cleaned container interior surface.

Also preferably, the angle between the first air knife dryer and the second air knife dryer is at least 25° to at most 155°, more preferably 45° to at most 135°, more preferably 55° to 125°, even more preferably 65° to 105°, even more preferably 70° to 110°, even more preferably 75° to 105°, even more preferably 80° to 100°, even more preferably 75° to 95°, even more preferably about 90°. The angular difference between air knife dryers may be measured from the perpendicular to the air knife dryer surface, which may usually correspond with the direction in which the air exits from the air knife.

The above arrangement of the first group of washing nozzles and air knife dryer and the second group of washing nozzles and air knife dryer may provide for a more efficient cleaning of the top and back surface of the container inside surface; the first group of washing nozzles.

The nozzles of the first group of washing nozzles may preferably be oriented backwards for better spraying the container back surface. At least a part of first group of nozzles may be oriented for spraying sideways to reach the edges of the container back surface during rotation of the rotatable head. The first air knife dryer may preferably be oriented backwards for drying the container back surface. The first air knife dryer may be provided with indentations that improve the drying efficiency.

The nozzles of the second group of washing nozzles may preferably be oriented upwards for spraying the container top surface. At least a part of the nozzles of the second group of washing nozzles may be oriented sideways to improve the washing efficiency during movement of the cleaning arm. The second air knife dryer may be oriented upwards to improve the drying efficiency during (downwards) movement of the cleaning arm. The second air knife dryer may be provided with indentations that improve the drying efficiency.

The main body may comprise a third washing nozzle or group of washing nozzles provided on one side preferably on opposite sides of the main body, preferably arranged in a line along a longitudinal direction of the main body, and a third and optionally a fourth air knife dryer provided on one sidewall preferably on opposite sidewalls of the main body. The washing nozzle(s) of the third group of washing nozzles may be arranged near or next to the edges along the sides of the main body. The washing nozzle(s) of the third group of washing nozzles may preferably be oriented sideways for spraying the sidewalls of the container inside surface. At least a part of the nozzles of the third group of washing nozzles may be oriented downwards to improve the washing efficiency during movement of the cleaning arm.

The third and/or fourth air knife dryers may be placed onto the sidewalls of the main body, or they may be integrated into the sidewalls of the main body and project laterally therefrom. The third and/or fourth air knife dryers may be oriented slightly downwards to improve the drying efficiency during (downwards) movement of the cleaning arm.

The main body may comprise a fourth washing nozzle or group of washing nozzles provided on one or both corners of the main body, preferably the near the distal end of the main body. The washing nozzle(s) of the fourth group of washing nozzles may be arranged near or on the corner edges of the main body. The washing nozzle(s) of the fourth group of washing nozzles may preferably be oriented diagonally for spraying the corners and/or the back edges of the container inside surface. The washing nozzle(s) of the fourth group of washing nozzles may be oriented sideways and/or downwards to improve the washing efficiency during (downwards) movement of the cleaning arm.

The main body can engage with a drive means for driving the movement of the cleaning arm. The main body can be mounted or connected onto a driving member of the drive means, which may then drive the movement of the cleaning arm, for instance by transferring movement from the drive means onto the main body. The main body may be configured to move such that the nozzles or groups of nozzles provided on the head and optionally on the body can follow the contours of the container, thereby allowing cleaning agent sprayed from the nozzles to reach most if not every part of the container inside surface.

The cleaning arm movement may include a rotating, turning or tilting motion of the main body. The cleaning arm may be rotated, from a first upright position, with the main body being vertically oriented, to a second level position, with the main body being horizontally oriented. The rotating motion may for example be realised by coupling the main body at its proximate end to a rotatable coupling member, comprising gears and shafts arranged in way to controllably rotate the main body about an axis that intersects through the rotatable coupling member and is perpendicular to the longitudinal axis of the main body. The skilled person understands that other rotatable systems exist in the art and the invention is not limited to any particular embodiment thereof.

The cleaning arm movement may also include an upward and downward motion of the main body. The up or down motion may be realised by respectively lifting and lowering the cleaning arm along a predefined, preferably linear, path. The lifting and lowering may for example realised by coupling the main body with a bearing allowing for vertical motion. Preferably the cleaning arm is lowered with the main body being in an approximately level position (i.e. horizontally oriented). The skilled person understands that other lifting systems exist in the art and the invention is not limited to any particular embodiment thereof.

The drive means may be a motorized drive means, for example electrically or pneumatically driven. The drive means may be controlled manually or receive predetermined instructions received from a control unit. The skilled person understands that other drive means exist in the art and the invention is not limited to any particular embodiment thereof.

The main body may preferably be produced from a metal or metal alloy, such as stainless steel, which may provide for improved material quality and corrosion resistance.

The rotatable head is or can be rotatably coupled with the main body such that it can rotate along at least a single axis of rotation to achieve at least a turning or tilting motion of the head in relation to the main body. The rotating motion of the head can allow the nozzles or groups of nozzles provided on the head to better follow the contours of the container, such that cleaning agent sprayed from the nozzles can reach most if not every part of the container inside surface. The rotating motion may for example be realised by providing one rotatable joint, preferably two oppositely disposed rotatable joints, at the distal end of the main body, which is configured to be coupled to a corresponding coupling member provided at the proximate end of the rotatable head. The coupling may allow for the rotatable head to controllably rotate about an axis through the rotatable coupling member that is perpendicular to, the longitudinal axis of the main body. The rotatable joint may be controlled manually or follow predetermined instructions received from a control unit. The skilled person understands that other rotatable systems exist in the art and the invention is not limited to any particular embodiment thereof.

The rotatable head may be produced from a metal or metal alloy, such as stainless steel, which may provide for improved material quality and corrosion resistance.

The cleaning arm may further comprise an essentially L-shaped extension which is configured for cleaning an (opened) container door inside surface;

- the L-shaped extension comprising an elongated body having a proximate end, which is attachable to the main body of the cleaning arm, and a distal end; and,
- the elongated body comprising a fifth washing nozzle or group of washing nozzles, preferably arranged in a line along a longitudinal direction of the elongated body, and a fifth air knife dryer, preferably provided on a sidewall of the elongated body.

The distal end of the elongated body of the L-shaped extension may be provided with two divergently arranged side members (i.e. a first and second side member) forming an essentially Y-shaped extension which is configured for cleaning an (opened) container door's top and side surfaces,

- a first side member comprising a sixth washing nozzle or group of washing nozzles, preferably provided near a terminal portion of said side member and a sixth air knife dryer preferably provided on a sidewall of the first side member; and,
- a second side member comprising a seventh air knife dryer, preferably provided on a sidewall of the second side member.

The L-shaped extension may have an l-shaped elongated body, which is attachable to a protruding base structure of the cleaning arm main body, thereby forming an essentially L-shaped structure upon attachment. Alternatively, the L-shaped extension may have an L-shaped body consisting of a base part and an elongated part extending from said base part, wherein the base part is attachable to the cleaning arm main body. The L-shaped body may consist of a single structure bent into an L-shape, or it may consist of multiple attached structures forming an essentially L-shaped structure. The skilled person understands that the intended purpose of the essentially L-shaped extension is to loop around the container sidewall and reach the container front door when the main body is inserted into the container interior hull. Accordingly, other shapes allowing for a similar effect, such as a T-shaped extension or a J-shaped extension, are understood to also be suitable for the present embodiment of the extension and the present invention is not limited to only the L-shaped embodiment.

The L-shaped extension's proximate end, preferably formed by the base of the elongated body, may be may be attached or attachable to the main body, preferably a sidewall near the main body's proximate end or an attachable structure protruding therefrom. The attached L-shaped extension is preferably mechanically fixated or fastened, such that when the main body is moved, e.g. rotated or lifted, the L-shaped extension is moved simultaneously along with the main body. This may allow for a single drive means to drive the movement of the entire cleaning arm, thereby removing the need for a second drive means for driving the movement of the L-shaped extension. Alternatively, the L-shaped extension may be rotatably attached, allowing independent movement of the L-shaped extension. The attached L-shaped extension is preferably disposed substantially parallel next to the main body, such that its elongated body is in line with the main body.

The washing nozzle(s) of the fifth group of washing nozzles may be provided on a single sidewall or on multiple sidewalls of the elongated body of the L-shaped extension, preferably being arranged in a line along a longitudinal direction of the elongated body. The washing nozzle(s) of the fifth group of washing nozzles may be arranged near or on the edges of the sidewall of the elongated body facing the main body of the cleaning arm (corresponding with the position of the opened container door upon insertion of the main body into the container hull). Preferably, the washing nozzle(s) of the fifth group of washing nozzles are arranged on an upper and/or lower sidewall contiguous to the sidewall of the elongated body facing the main body of the cleaning arm. The washing nozzle(s) of the fifth group of washing nozzles may preferably be oriented sideways for spraying the container door. At least part of the nozzles of the fifth group of washing nozzles may be oriented downwards to improve the washing efficiency during (downward) movement of the cleaning arm.

The fifth air knife dryer may be placed onto the sidewall of the elongated body facing the main body of the cleaning arm, or it may be integrated into said sidewall and project laterally therefrom. The fifth air knife dryer may be oriented slightly downwards to improve the drying efficiency during (downwards) movement of the cleaning arm.

The washing nozzle(s) of the sixth group of washing nozzles may be provided on a single sidewall or on multiple sidewalls of the divergently arranged side members of the Y-shaped extension, preferably being arranged in a line along a longitudinal direction of the side member. The washing nozzle(s) of the sixth group of washing nozzles may be arranged near or on the edges of the sidewall of a side member facing the main body of the cleaning arm (corresponding with the position of the opened container door upon insertion of the main body into the container hull). Preferably, the washing nozzle(s) of the sixth group of washing nozzles are arranged on an upper and/or lower sidewall contiguous to the sidewall of a side member facing the main body of the cleaning arm. The washing nozzle(s) of the sixth group of washing nozzles may preferably be oriented sideways for spraying the container door, in particular the container door's top and side surfaces. At least part of the nozzles of the sixth group of washing nozzles may be oriented downwards to improve the washing efficiency during (downward) movement of the cleaning arm.

The sixth and/or seventh air knife dryers may be placed onto a sidewall of a first and/or second side member facing the main body of the cleaning arm, or it may be integrated into said sidewall and project laterally therefrom. The sixth and/or seventh air knife dryers may be oriented slightly downwards to improve the drying efficiency during (downwards) movement of the cleaning arm. The washing or washer nozzle refers to a device typically used for spraying cleaning agent onto a surface, in this case the container surface. The washing nozzle may comprise a pipe or tube of varying cross-sectional area through which cleaning agent can exit. The shape and diameter of the outlet may be modified to control the liquid's exit velocity, flow pattern and spray angle (e.g. flat fan, hollow cone, full cone, solid stream, mist, etc.). Preferably for the present application the liquid exit velocity is kept high enough to fully spray off any contaminants or shipping debris from the container surface in a single cleaning arm movement. The skilled person understands that there exist various washing nozzles in the art and the invention is not limited to any particular embodiment thereof.

The cleaning agent may be delivered to a washing nozzle or group of washing nozzles through a fluid conduit or arrangement of interconnected fluid conduits disposed at least partially, preferably mostly, more preferably entirely, within the cleaning arm. The fluid conduit forms a path through which the cleaning agent (e.g. water) provided by a water supply source may be routed and ultimately delivered to the washing nozzles. The water supply source may be located externally and connected to an inlet of the cleaning arm's washing fluid conduit. Optionally, a device for generating water pressure, such as a water pump, may be provided between the water supply source and the washing fluid conduit's inlet, and/or along sections of the washing fluid conduits. Optionally, a device or compartment for mixing commercial cleaning products, such as detergent or disinfectants, with water from the water supply source may be provided between the water supply source and the washing fluid conduit's inlet, and/or along sections of the washing fluid conduit.

The fluid conduit may comprise a plurality of interconnected pipes, such as a stainless-steel pipe or a plastic pipe. The fluid conduit may comprise ancillary tools commonly used in the art, including, but not limited to, fittings, adapters, separators, diverters, valves, sealing rings or members, retaining clips, filters, counters, ducts, and so on. Various sealing and connecting mechanisms may be suitable for the fluid conduits and the invention is by no means limited to any particular embodiment thereof.

Cleaning agent (e.g. water) provided by a water supply source may flow into the fluid conduit of the cleaning arm and be collected in a fluid or water collector. The fluid collector may temporarily store the cleaning agent to be distributed to one or more washing nozzles or nozzle groups. This may allow for the cleaning agent to remain near (in close proximity) the washing nozzles and reduce the amount of remaining cleaning agent left in the fluid conduits between the water supply source and the washing nozzles. As a result, the reaction time between opening and closing the washing nozzles may be reduced. The cleaning arm may comprise multiple fluid collectors, for example, a first fluid collector disposed near the washing nozzles provided on the sides of the main body, and a second fluid collector disposed near the washing nozzles provided on the rotatable head, a third fluid collector disposed near the washing nozzles provided on the L-shaped extension, and so on.

The cleaning agent may flow into the main body of the cleaning arm through a rotary valve, which connects the 'static' fluid conduit piping outside with the 'moveable' cleaning arm. This allows for e.g. rotation of the cleaning arm without damaging the piping connecting to the water supply source, such as the water feed.

The flow of cleaning agent may be controlled using one or more valves configured for selectively sending cleaning agent to the one or more washing nozzles or groups of washing nozzles. Preferably, the fluid conduct comprises at least one valve configured for selectively sending cleaning agent to a washing nozzle group of washing nozzles for each washing nozzle or group of washing nozzles comprised in the cleaning arm, such that a flow of cleaning agent to each washing nozzle or group of washing nozzles may be selectively controlled during the cleaning cycle.

The controllable valves may be ball valves; for example, electrically of pneumatically actuated ball valves. The actuator of the ball valves may open and close the ball valve providing a hole through one side to allow flow when turned appropriately. The controllable valves can be 2-way or 3-way valve depending on the fluid connection.

In some embodiments, the cleaning arm comprises a controllable valve configured for selectively sending cleaning agent to a washing nozzle or washing nozzle group from the following list: first washing nozzle or group of washing nozzles, second washing nozzle or group of washing nozzles, third washing nozzle or group of washing nozzles, fourth washing nozzle or group of washing nozzles, fifth washing nozzle or group of washing nozzles, and/or sixth washing nozzle or group of washing nozzles; preferably wherein the controllable valve is a ball valve, such as an electrically of pneumatically actuated ball valve.

In an exemplary embodiment the cleaning arm comprises a fluid collector disposed at least partially, preferably completely, within the cleaning arm; the fluid collector having an inlet for receiving cleaning agent from a water supply source, and at least one outlet provided with a controllable valve configured for selectively sending cleaning agent to a washing nozzle or nozzle group from the following list: first washing nozzle or group of washing nozzles, second washing nozzle or group of washing nozzles, third washing nozzle or group of washing nozzles, fourth washing nozzle or group of washing nozzles, fifth washing nozzle or group of washing nozzles, and/or sixth washing nozzle or group of washing nozzles. By selectively opening one or more valves the cleaning agent may flow to the fluidly connected washing nozzles or groups of washing nozzles, which may allow for improved control of the distribution of cleaning agent stored in a fluid collector.

The air knife dryer refers to a device typically used for blowing off liquid or debris from a surface, in this case the container surface. The air knife dryer may comprise an air plenum containing a series of holes or continuous slots through which moving air can exit in a laminar flow pattern. The exiting air velocity can be altered to modify the drying intensity of the air knife dryer. Preferably for the present application the air velocity is kept high enough to fully blow off the cleaning or rinsing liquid from the container surface in a single cleaning arm movement. The skilled person understands that there exist various air knife dryers in the art and the invention is not limited to any particular embodiment thereof.

The drying air may be delivered to an air knife dryer through an air conduit or arrangement of interconnected air conduits disposed at least partially, preferably mostly, more preferably entirely, within the cleaning arm for cleaning the container. The air conduit forms a path through which the drying air provided by an air supply source may be routed and ultimately delivered to the air knives. The drying air supply source may be located externally and be connected to an inlet of the cleaning arm's air conduit. Alternatively, at least a part of the drying air supply source may be disposed within the cleaning arm taking in air via one or more air supply inlets.

The flow of drying air may be controlled using one or more valves configured for selectively sending drying air to the one or more air knife dryers. Preferably, the air conduct comprises at least one valve configured for selectively sending drying air to each air knife dryer that may be closed off during the cleaning cycle. The controllable valve may be a shut-off valve, for example a valve having a moveably arranged rigid strip that is moveable by a piston, for example a pneumatically driven piston.

In an exemplary embodiment the cleaning arm comprises a shut-off valve configured for selectively shutting off the third and/or fourth air knife dryers provided on the sidewalls of the main body; preferably by selectively blocking the flow of drying air to the third and/or fourth air knife dryers. During the cleaning cycle whilst the top inner surface of the box is being cleaned, the third and/or fourth air knife dryers may be redundant. By selectively shutting down these dryers, airflow to the remaining air knife dryers such as those provided on the rotatable head may be increased, which may improve the local drying result due to increased air pressure. The shut-off valve may comprise a rigid strip, such as a metal or plastic strip, which is connected to the main body by a pneumatic piston. When the piston is retracted, the air can flow to the third or the fourth air knife dryers. When the piston is extended, the airflow will be restricted; for example, to only ⅓ of the air knife dryers drying area. By connecting two such pistons back to back, only one electro-pneumatic control valve may be required to control the first and the second shut-off valves.

In an exemplary embodiment the cleaning arm comprises a switching valve configured for selectively shutting off the sixth or seventh air knife dryers provided on the Y-shaped extension of the L-shaped extension; preferably by selectively blocking the flow of drying air to the sixth or seventh air knife dryers. The switching valve may comprise a rigid strip, such as a metal or plastic strip, which is connected to the L-shaped extension by a pneumatic piston. When the piston is retracted, airflow to the sixth air knife dryer will be restricted but flow to the seventh air knife dryer will be possible. When the piston is extended, airflow to the seventh air knife dryer will be restricted but flow to the sixth air knife dryer will be possible. This way the valve may allow for selectively switching the air flow between the sixth and the seventh air knife dryers. Additionally, the switching valve may be operatively connected to a controllable valve, preferably a pneumatically actuated ball valve, configured for selectively sending cleaning agent to the sixth washing nozzle or group of washing nozzles. This way the same air pressure may be used to control the flow of air and cleaning agent, in particular by connecting the flow of cleaning agent into the sixth washing nozzle with the flow of drying air into the sixth air knife dryer. If the flow of drying air to the seventh air knife is not restricted, cleaning sprayed by the sixth washing nozzle may be blown away and cause an undesirable spray during the cleaning cycle, especially during downward movement of the L-shaped extension.

A further aspect of the present invention relates to a container cleaning installation for cleaning containers, in particular for cleaning the interior surface of a container. Preferred embodiments of the cleaning arm are understood to also be preferred embodiments of the container cleaning installation.

The container cleaning installation may comprise:

- a cleaning arm according to one or a combination of embodiments as described herein;
- a drive means for driving the cleaning arm's movement;
- a water supply source for providing cleaning agent preferably comprising a water pump; and,
- an air supply source for providing drying air, preferably comprising an air blower.

The water supply source may comprise a water feed, such as an external plumbing system, having a water supply source outlet that is connected or connectable to an inlet of the cleaning arm's washing fluid conduit. Additionally, the water supply source may comprise a water recycling system that collects and optionally used cleaning agent (i.e. water) by the container cleaning installation; the water recycling system is discussed further below. Optionally, a device for generating water pressure, such as a water pump, may be provided between the water supply source outlet and the fluid conduit inlet.

The water supply source outlet may be coupled to the cleaning arm's fluid washing conduit inlet by means of a connective conduit that defines a first portion of the fluid flow path. The connective fluid conduit may for example be a hose, such as a flexible hose, or a pipe, such as a stainless-steel pipe or a plastic pipe. The connective conduit may be fixed to the pipe on the rotating arm, for example by means of a rotary union or joint. Optionally, a one-way sealing device, such as anon-return check valve, may be provided onto the connective fluid conduit to prevent back-flow of fluid. The connective conduit may further comprise ancillary tools commonly used in the art, including, but not limited to, interconnecting piping, fittings, adapters, ducts, diverter valves, filters, counters, separators, hoses, ducts, and so on. In this manner, the water supply source and washing fluid conduit can be fluidly coupled, thereby allowing water discharged from the air supply source to flow through the washing fluid conduit into the washing nozzles.

Optionally, a device for generating water pressure, such as a water pump, may be provided between the water supply source outlet and the washing fluid conduit inlet. Optionally, a device or compartment for mixing commercial cleaning products, such as detergent or disinfectants, with water from the water supply source may be provided between the water supply source outlet and the washing fluid conduit inlet.

Optionally, flow of liquid from the water supply source may be controlled using a water supply source valve. The valve may contain an emergency shut-down system for automatically closing the water supply in case of faulty operation. To improve accessibility, the water supply source valve may be placed outside the cleaning arm, for example, on a nearby positioned valve rack. This may also improve the safety of operators and allow easier maintenance of the cleaning arm. The air supply source may comprise a device for providing or generating a fluid for use as drying air to be discharged by the air knives provided on the cleaning arm. The air supply source may have an air supply source outlet that is connected or connectable to an inlet of the cleaning arm's drying air conduit. The air supply source may be housed within an enclosure.

In an exemplary embodiment the air supply source may include a (high flow) air blower, such as a centrifugal blower, which may include a turbine and a motor. The operating characteristics of the air blower may for example provide an air flow having a pressure of approximately 14.800 Pa and/or having a flow rate of approximately 38 $m^3$/min. The skilled person understands that the air flow pressure and/or flow rate can be easily decreased or increased, and the recited values merely represent preferred exemplary values thereof.

The air supply source may include an outlet coupled to an inlet of the cleaning arm's drying air conduit that defines a first portion of the flow path. The air supply source's outlet may be coupled to the cleaning arm's air conduit inlet by means of a connective conduit. The connective air conduit may for example be a hose, such as a flexible hose, or a pipe, such as a stainless-steel pipe or a plastic pipe. The connective conduit may comprise ancillary tools commonly used in the art, including, but not limited to, interconnecting piping, fittings, adapters, ducts, diverter valves, filters, counters, separators, hoses, ducts, and so on. In this manner, the air supply source and air conduit can be fluidly coupled, thereby allowing air discharged from the air supply source to flow through the air conduit into the air knife dryers.

If the airflow velocity provided by the air supply source is too high, an undesirable backsplash of water can be created due to the close proximity of the air coming out of the air knives to the container surface. The airflow can be reduced by redirecting a portion of the air coming from the air supply source to a dead end, such as blind flange, using a two-way valve disposed along the connective air conduit. In this way the air supply source, like the (high flow) air blower, can turn continuously at the same speed, which may drastically reduce wear of the motor.

The container cleaning installation may further comprise a container cover configured for covering at least part of an exterior surface of the container from getting wet during the cleaning cycle. The container cover may be a moveable sheet or plate that can engage and preferably connect to a part of the container, such as a bottom part, a top part, a back part, etc. The cover may extend and retract between the cleaning cycles, which may allow for easier transportation of the container. The cover may for instance be pneumatically pushed against the container surface.

The container cover may comprise a container bottom cover for covering the container bottom surface. This may prevent any fluid from dripping or leaking from the container's interior onto the area underneath the container. Preferably the container cover will cover the bottom of the container, for instance by engaging with the bottom interior surface of the container. This way the cover may protect the container bottom from getting wet by shielding the container bottom from cleaning agent being sprayed onto or blown off from the container walls and additionally guiding the cleaning agent flowing away from the container interior.

The container cleaning installation may further comprise a container transportation means, preferably comprising a chain conveyor belt and at least one mechanical stopper. This allows for safely and efficiently transporting containers throughout the cleaning cleaning installation. In an exemplary embodiment the conveyor belt may consists of one or two linked chains, arranged laterally and at a distance from each other, in which the links of one chain are connected to corresponding links of the other chain.

The container cleaning installation may further comprise a water collecting and recycling system. The collecting of water may be achieved by providing an enclosure below the cleaning arm, onto which the container may be placed, which will receive most if not all of the used cleaning agent flowing from the container during the cleaning cycle. The enclosure may be titled to naturally guide the water to an inlet to a water recycling system. The recycling system may comprise a one or more devices known in the art for improving the water quality by removing leftover waste, contaminants, and the like. The filters may for example be mechanical or chemical filters.

Additionally, the recycling system may comprise a one or more devices known in the art for purifying the recycled water from pathogens and microorganisms, such as bacteria, viruses, protozoan cyst, and the like. The purification device may for example be an UV-light emitting device.

A further aspect of the present invention relates to a method for cleaning a container with a cleaning arm as described herein, the method comprising the steps of:

washing the container by spraying cleaning agent from at least one washing nozzle or group of washing nozzles onto a container surface; and, drying the container by blowing drying air from at least one air knife dryer;

wherein the washing and drying of the container are performed in tandem.

In tandem may refer to the washing and drying being performed in conjunction with each other, i.e. being performed at least partially simultaneously or at the very least performed in close time proximity to each other.

The method may provide for improved and/or faster cleaning results, without allowing the wet container surface to stagnate and grow contaminants (e.g. pathogens and microorganisms) and/or form ice on the container walls or along the transport line. Preferably the at least one air knife dryer may be positioned adjacent to the at least one washing nozzle or group of washing nozzles, such that the container surface may be dried immediately during and/or after washing.

An exemplary cleaning cycle of a container interior may proceed as follows: Between cleaning cycles the cleaning arm may be kept in an upright position (i.e. the cleaning arm is vertically oriented) with the rotatable head being positioned above the main body.

The cleaning cycle may start by rotating the cleaning arm forwards towards the container. Preferably, the rotation includes a forward tilting motion to tilt the uprightly positioned cleaning arm into the container interior hull, towards the container back end. As soon as the rotatable head enters the container the cleaning arm may start washing the container interior top surface and edges; preferably by spraying cleaning agent from the second washing nozzle or group of washing nozzles and from the fourth washing nozzle or group of washing nozzles. Simultaneously the cleaning arm may start drying the container interior top surface and edges; preferably by blowing drying air from the second air knife dryer.

The cleaning cycle may continue by rotating the cleaning arm further forward towards the back end of the container. As soon as the main body enters the container the cleaning arm may start washing the container side surfaces; preferably by spraying cleaning agent from the third washing nozzle or group of washing nozzles. Simultaneously the cleaning arm may start drying the container interior side surfaces; preferably by blowing drying air from the first third and/or fourth air knife dryers.

As the rotatable head reaches the back end of the container, the cleaning arm will preferably be fully inserted into the container interior hull and further rotation of the cleaning arm may be stopped to prevent collision. Preferably at this point the cleaning arm reached a near-level position (i.e. the cleaning arm is almost horizontally oriented). The rotatable head may start rotating to wash the top corners and edges; preferably by spraying cleaning agent from the second washing nozzle or group of washing nozzles. Simultaneously the cleaning arm may start drying the container interior side surfaces; preferably by blowing drying air from the second air knife dryer.

The cleaning cycle may continue by lowering the cleaning arm towards the bottom end of the container. During the lowering the cleaning arm may start washing the container interior back surface and edges; preferably by spraying cleaning agent from the first washing nozzle or group of washing nozzles. Simultaneously the cleaning arm may start drying the container interior back surface and edges; preferably by blowing drying air from the first air knife dryer.

As the cleaning arm reaches the bottom end of the container, further lowering of the cleaning arm may be stopped to prevent collision. Optionally, the cleaning arm may rotate further forward towards the bottom of the container to reach a level position (i.e. the cleaning arm is horizontally oriented). The cleaning cycle may continue by lifting the cleaning arm while simultaneously rotating the cleaning arm backwards away from the container. Preferably, the rotation includes a backward tilting motion to tilt the levelly positioned cleaning arm out of the container interior hull, away from the container back end. During the lifting the cleaning arm may start washing the container interior bottom surface and edges; preferably by spraying cleaning agent from the first washing nozzle or group of washing nozzles. Simultaneously the cleaning arm may start drying the container interior bottom surface and edges; preferably by blowing drying air from the first air knife dryer.

As the cleaning arm reaches the top end of the container the cleaning cycle may end with the cleaning arm being in an upright position (i.e. the cleaning arm is vertically oriented) with the rotatable head being positioned below the main body. The cleaned container may be transported, and a new container may be provided.

The container door may be cleaned with the L-shaped extension of cleaning arm while the container interior is cleaned with the main body and rotatable head of the cleaning arm. With reference to above discussed cleaning cycle of a container interior, an exemplary cleaning cycle of a container door may proceed as follows:

As soon as the L-shaped extension reaches container door surface during forward tilting motion of the cleaning arm, the cleaning arm may start cleaning the container door surface; preferably by spraying cleaning agent from the fifth washing nozzle or group of washing nozzles. Simultaneously the cleaning arm may start drying the container door top surface; preferably by blowing drying air from the fifth air knife dryer.

As soon as the Y-shaped extension reaches a top of the container door during forward tilting motion of the cleaning arm, the cleaning arm may start cleaning the container door top surface; preferably by spraying cleaning agent from the sixth washing nozzle or group of washing nozzles. Simultaneously the cleaning arm may start drying the container door top surface; preferably by blowing drying air from the sixth air knife dryer.

As soon as a first side member of the Y-shaped extension reaches a top of the container door during forward tilting motion of the cleaning arm, the cleaning arm may start cleaning the container door top surface; preferably by spraying cleaning agent from the sixth washing nozzle or group of washing nozzles. Simultaneously the cleaning arm may start drying the container door top surface; preferably by blowing drying air from the sixth air knife dryer.

As soon as a first side member of the Y-shaped extension reaches a back end of the container door during forward tilting motion of the cleaning arm, the cleaning arm may switch off the sixth washing nozzle or group of washing nozzles to prevent the container exterior top and back from getting wet. Optionally, a switching valve may switch off the drying with the sixth air knife dryer and start drying the container door back edges; preferably by blowing drying air from the seventh air knife dryer.

In a further aspect, the present invention relates to a use of a cleaning arm according to one or a combination of embodiments as described herein for cleaning an (insulated) container, preferably an interior surface of an (insulated) container and/or an interior door surface of an (insulated) container. Preferred embodiments of the cleaning arm are understood to also be preferred embodiments of the use of said cleaning arm.

In a further aspect, the present invention relates to a use of a container cleaning installation according to one or a combination of embodiments as described herein for cleaning an (insulated) container, preferably an interior surface of an (insulated) container and/or an interior door surface of an (insulated) container. Preferred embodiments of the container cleaning installation are understood to also be preferred embodiments of the use of said container cleaning installation.

EXAMPLES

To better illustrate the properties, advantages, and features of the present invention some preferred embodiments are disclosed as examples with reference to the enclosed figures. However, the scope of the present invention is by no means limited to one the illustrative examples presented below.

Example 1: Cleaning Arm

Figure 2:
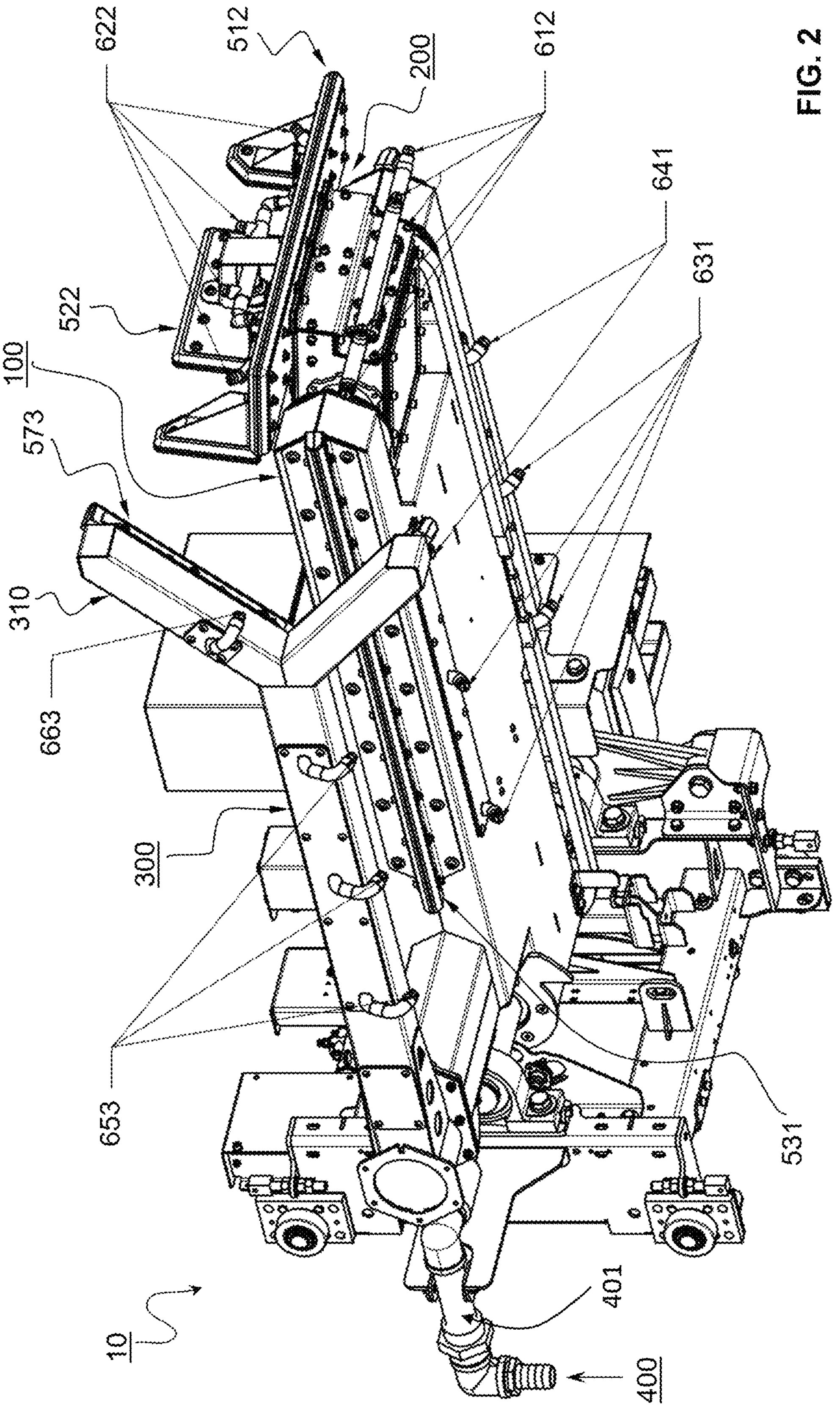
FIG. 2 is a bottom perspective view of a cleaning arm (10) according to a preferred embodiment of the present invention.

Example 1 is described with reference to FIGS. 1 and 2, which show a preferred embodiment of a container cleaning arm (10) comprising a main body (100) coupled to a rotatable head (200) and having an L-shaped extension. In particular, FIG. 1 shows the cleaning arm (10) in a top perspective view and FIG. 2 in a bottom perspective view.

Figure 5A:
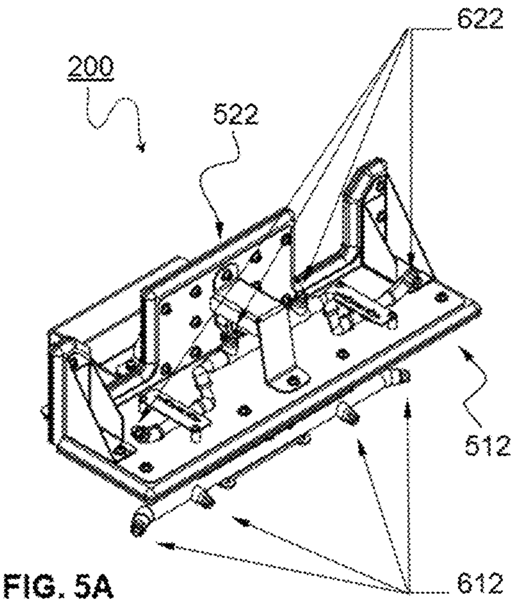
FIG. 5A is a front perspective view of a rotatable head (200) according to a preferred embodiment of the present invention from a front-side view.
Figure 5B:
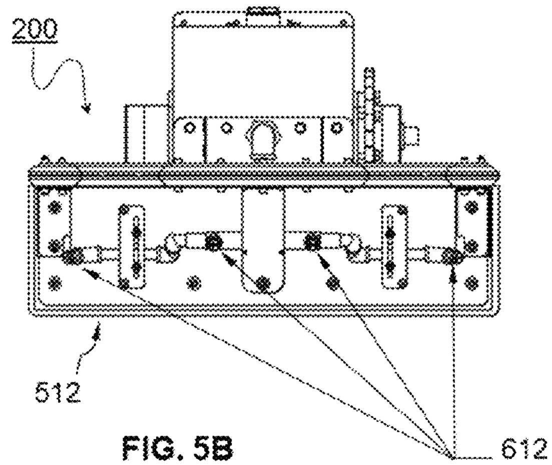
FIG. 5B is a top view of a rotatable head (200) according to a preferred embodiment of the present invention.
Figure 5C:
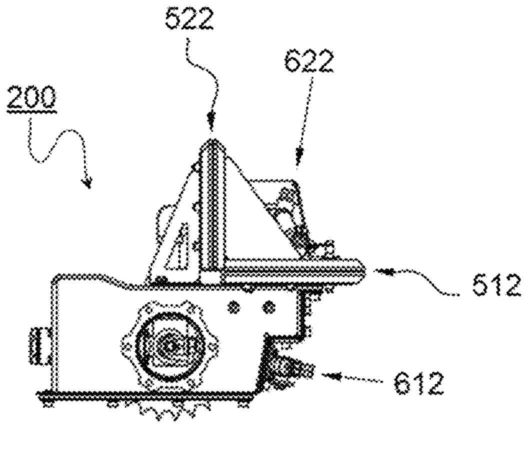
FIG. 5C is a side view of rotatable head (200) according to a preferred embodiment of the present invention.
Figure 5D:
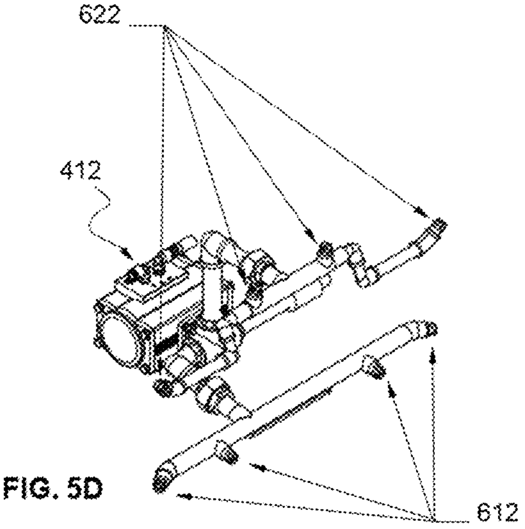
FIG. 5D shows a portion of the fluid conduit that may be utilized in the rotatable head (150).

The rotatable head (200) comprises a first group of washing nozzles (612) arranged in a line and a first air knife dryer (512) positioned adjacent to the first group of washing nozzles (612). The rotatable head (200) also comprises a second group of washing nozzles (622) arranged in a line and a second air knife dryer (522) provided adjacent to the second group of washing nozzles (622). The first group of washing nozzles (612) are disposed at an angle of approximately 90° relative to the second group of washing nozzles (622). This arrangement allows the first group of washing nozzles (612) to wash the container interior back surface (911) while the second group of washing nozzles (622) washes the container interior top surface (915). Also, the first air knife dryer (512) is disposed at an angle at an angle of approximately 90° relative to the second air knife dryer (522) such that each air knife dryer (512, 522) dries a different part of the container interior surface. FIG. 5 shows the rotatable head (200) in greater detail; in particular FIG. 5A shows the rotatable head (200) in a front perspective view, FIG. 5B in a top view and FIG. 5C in a side view.

Figure 4A:
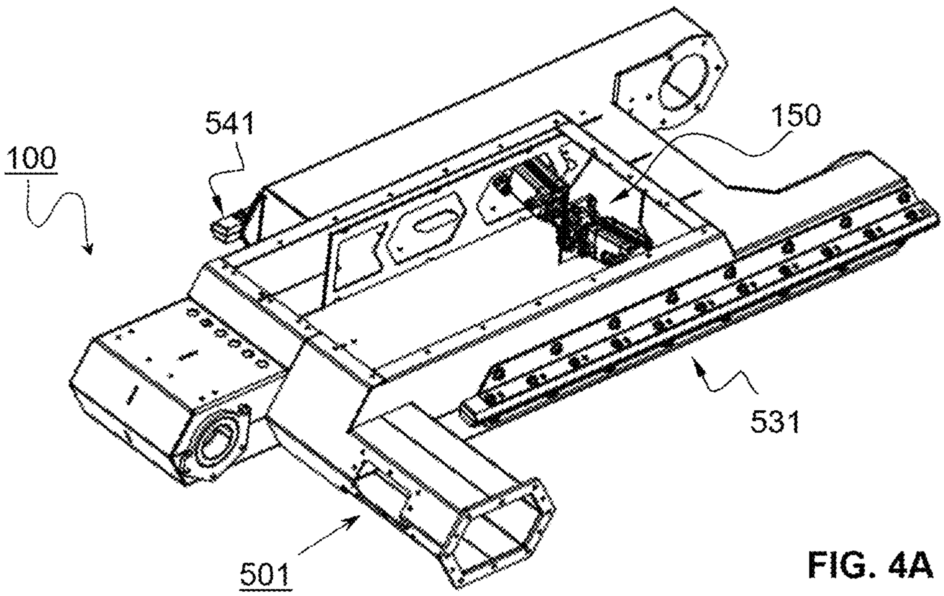
FIG. 4A is a rear perspective view of a main body (100) according to a preferred embodiment of the present invention.

The main body (100) comprises a third group of washing nozzles (631) arranged in a line on opposite sides of the main body (100) along a longitudinal direction of the main body (100). Further, the main body (100) comprises a third air knife dryer (531) and a fourth air knife dryer (541), which are provided on opposite sidewalls of the main body (100). Further still, the main body (100) comprises a fourth group of washing nozzles (641) provided on both corners of the main body (100) near a distal end of the main body (100), adjacent to the coupling with the rotatable head (200). This arrangement allows the third group of washing nozzles (631) to wash the container interior side surfaces (913) while the fourth group of washing nozzles (622) wash the container interior corners. FIG. 4A shows the main body (100) in greater detail in a rear perspective view.

Figure 6A:
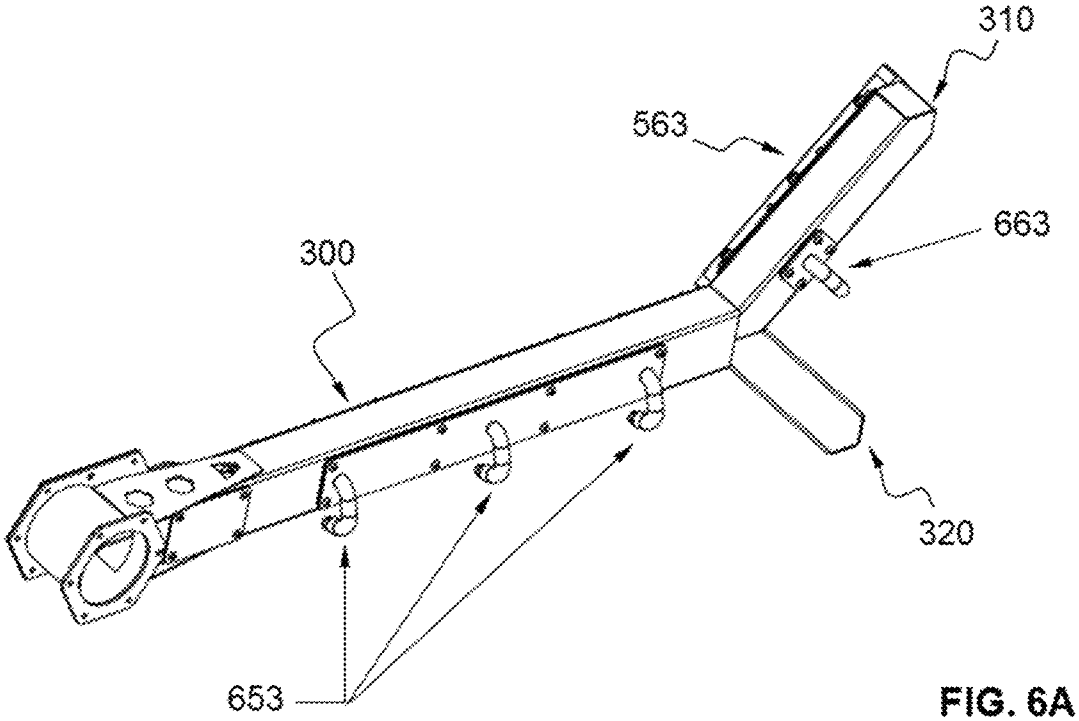
FIG. 6A is a top perspective view of an L-shaped extension according to a preferred embodiment of the present invention.
Figure 6B:
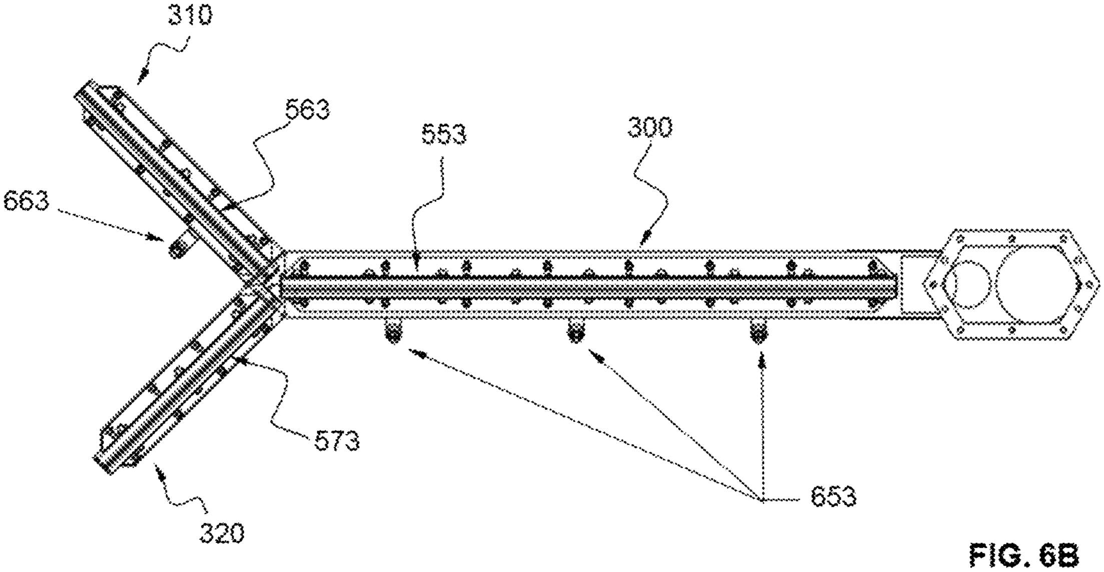
FIG. 6B is a side view of an L-shaped extension according to a preferred embodiment of the present invention.

The L-shaped extension comprises an elongated body (300), which comprises a fifth group of washing nozzles (653) arranged in a line along a longitudinal direction of the elongated body (300) and a fifth air knife dryer (553) provided on a sidewall of the elongated body (300). The L-shaped extension further comprises two divergently arranged side members (310, 320) which form an essentially Y-shaped extension. The first side member (310) comprises a sixth washing nozzle (663) provided near a terminal portion of said first side member (310) and a sixth air knife dryer (563) provided on a sidewall of said first side member (310). The second side member (320) comprises a seventh air knife dryer (573) provided on a sidewall of said second side member (320). FIG. 6 shows the L-shaped extension in greater detail; in particular FIG. 6A shows the L-shaped extension in a side perspective view and FIG. 6B in a side view.

Figure 3:
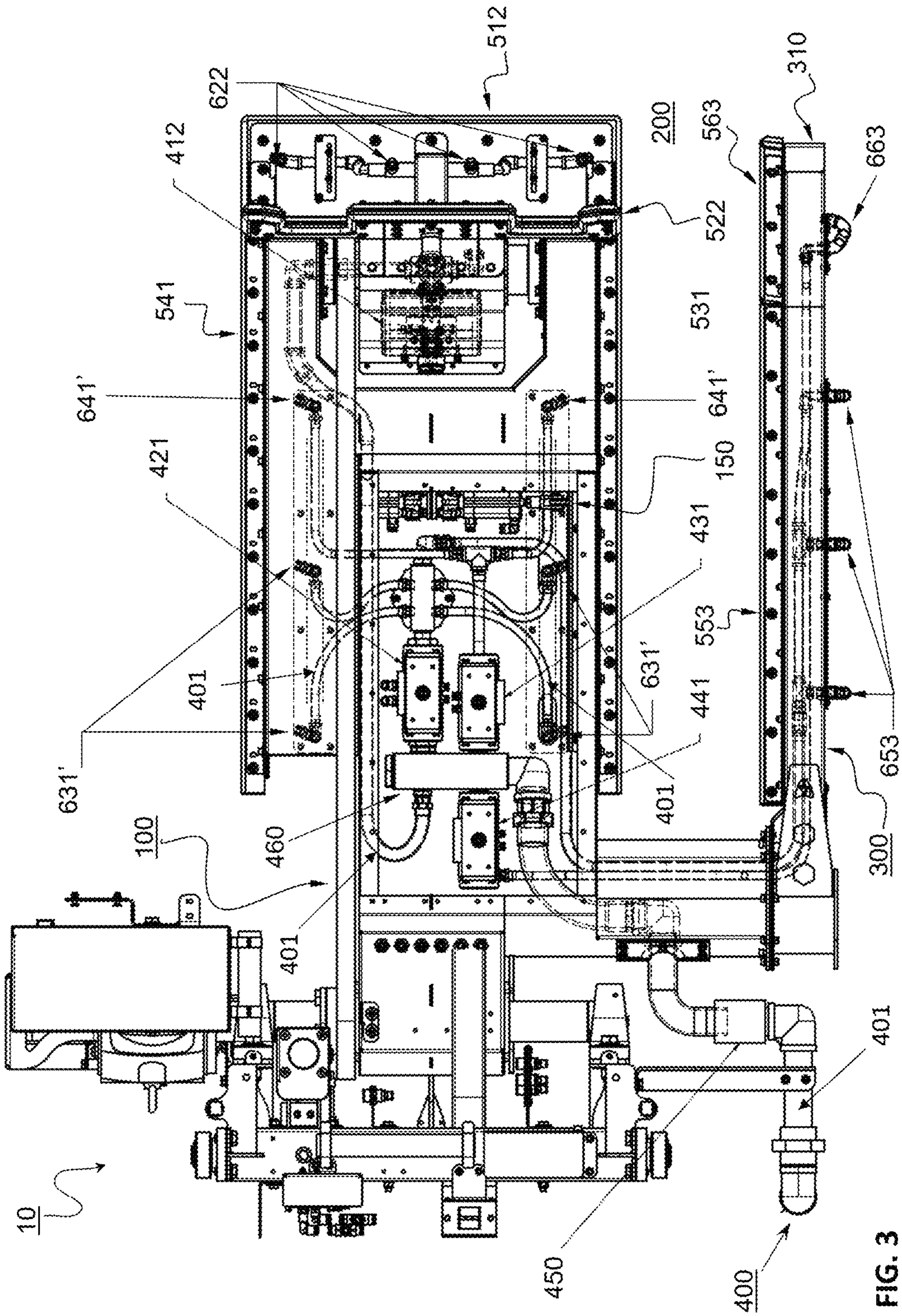
FIG. 3 is a cross-sectional view of a cleaning arm (10) according to a preferred embodiment of the present invention.

The preferred embodiment of the cleaning arm (10) further comprises a fluid conduit (401) for conveying cleaning agent to the washing nozzles and an air conduit for delivering drying air to the air knife dryers. The fluid and air conduits are described with reference to FIG. 3, which is a cross-sectional view of the cleaning arm (10).

Figure 7A:
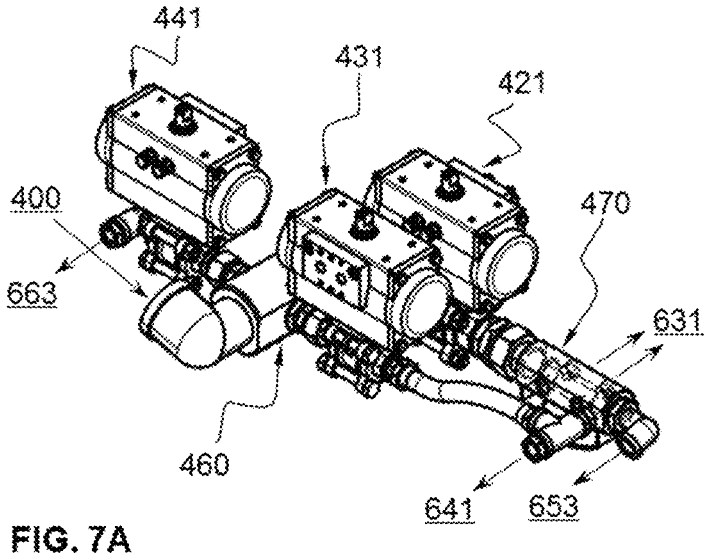
FIG. 7A is a side perspective view of a portion of the fluid conduit system disposed within the main body (100) according to a preferred embodiment of the present invention from a side view.
Figure 7B:
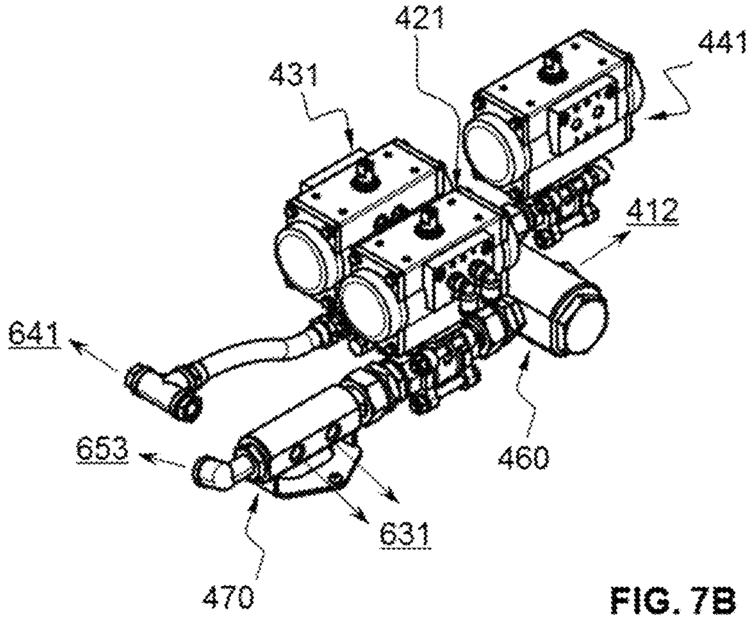
FIG. 7B is a side perspective view of a portion of the fluid conduit system disposed within the main body (100) according to a preferred embodiment of the present invention from a side view.
Figure 7C:
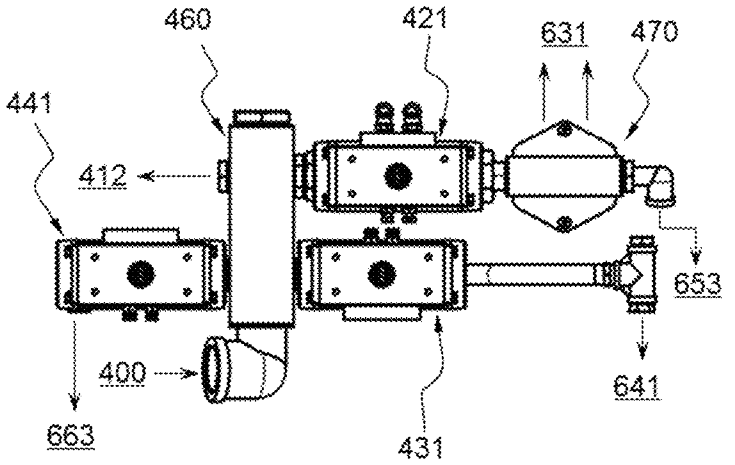
FIG. 7C is a top view of a portion of the fluid conduit system disposed within the main body (100) according to a preferred embodiment of the present invention from a top view.

The fluid conduits (401) comprise a series of interconnected pipes forming a flow path for a cleaning agent (e.g. water) to flow from a water supply source (400) to the six washing nozzles and washing nozzle groups. The cleaning agent may flow into the main body (100) through a rotary valve (450), which connects the 'static' fluid conduit piping outside with the 'moveable' cleaning arm. The cleaning agent may be temporarily stored in a fluid collector (460) disposed within the main body (100). The flow of the cleaning agent may be controlled using a plurality of controllable valves connected to an outlet of the fluid collector (460). A first controllable valve (412) controls the flow to the first (612) and/or the second group of washing nozzles (622). In the present example the first controllable valve (412) may be connected to the collector by means of a (G½") size connection. When pressurized cleaning fluid is supplied to the collector (460) it may allow or block to the washing nozzles provided on the rotatable head (200). In particular, depending on the position of the valve, the cleaning fluid may flow to the first (612) and/or the second group of washing nozzles (622). However, the flow of cleaning fluid may be completely stopped by closing off the water supply valve on the nearby located valve rack (830). A second controllable valve (421) controls the flow to the third (631) and/or the fifth group of washing nozzles (653); in the present example the second controllable valve is a DN20 ball valve. Additionally, a smaller collector provided with five connections is connected to the valve to feed every washing nozzle of the third and fifth group of washing nozzles individually. The connections feeding the washing nozzles of the third group of washing nozzles may be (G¼") connections. The connections feeding the washing nozzles of the fifth group of washing nozzles may be (G⅜") connections. A third controllable valve (431) controls the flow to the fourth group of washing nozzles (641); in the present example the third controllable valve is a DN10 ball valve. A fourth controllable valve (441) controls the flow to the fifth (653) and/or the sixth group of washing nozzles (663); in the present example the fourth controllable valve is a DN10 ball valve. FIG. 7 shows the fluid conduits that are disposed within the main body (100) in greater detail; in particular FIG. 7A is a side perspective view, FIG. 7B is another side perspective view and FIG. 7C is a top view.

Figure 4B:
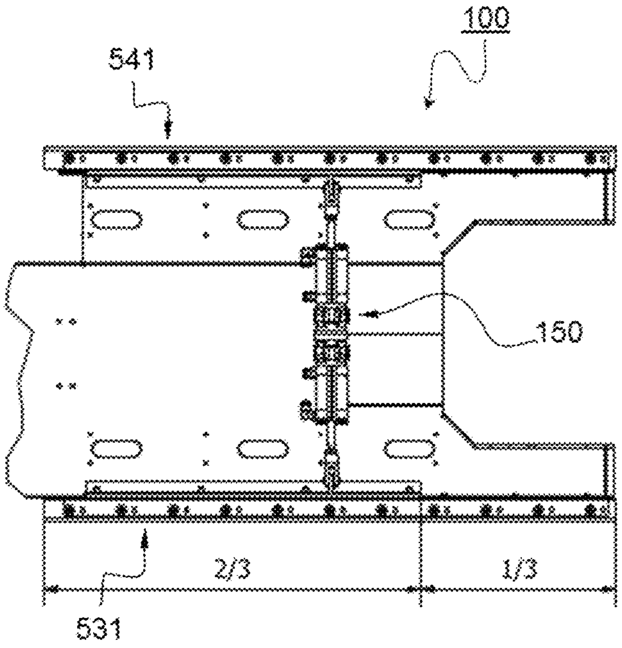
FIG. 4B is a cross-sectional view of a portion of a main body (100) according to a preferred embodiment of the present invention.
Figure 4C:
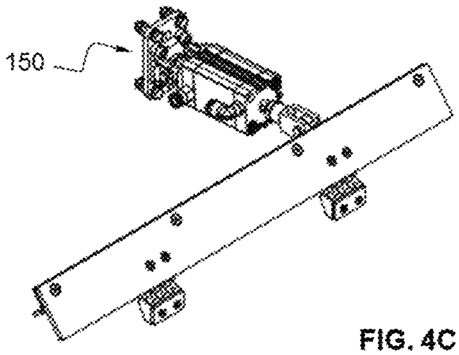
FIG. 4C shows an exemplary air shut-off valve (150) that may be utilized in the main body (100).

The air conduits (501) comprise a series of interconnected paths forming a flow path for the drying air to flow from an air supply source to the seven air knife dryers. The paths are formed by the hollow space enclosed by the exterior of the main body (100). FIG. 4 shows the air conduits (501) that are disposed within the main body (100) in greater detail; FIG. 4A is a rear perspective view and FIG. 4B is a cross-sectional view. The flow to third air knife dryer (531) and the fourth air knife dryer (541) is controlled using two pneumatically controlled shut-off valves (150) arranged back-to-back. FIG. 4C shows a shut-off valve (150) in greater detail.

Example 2: Cleaning Installation

Figure 8A:
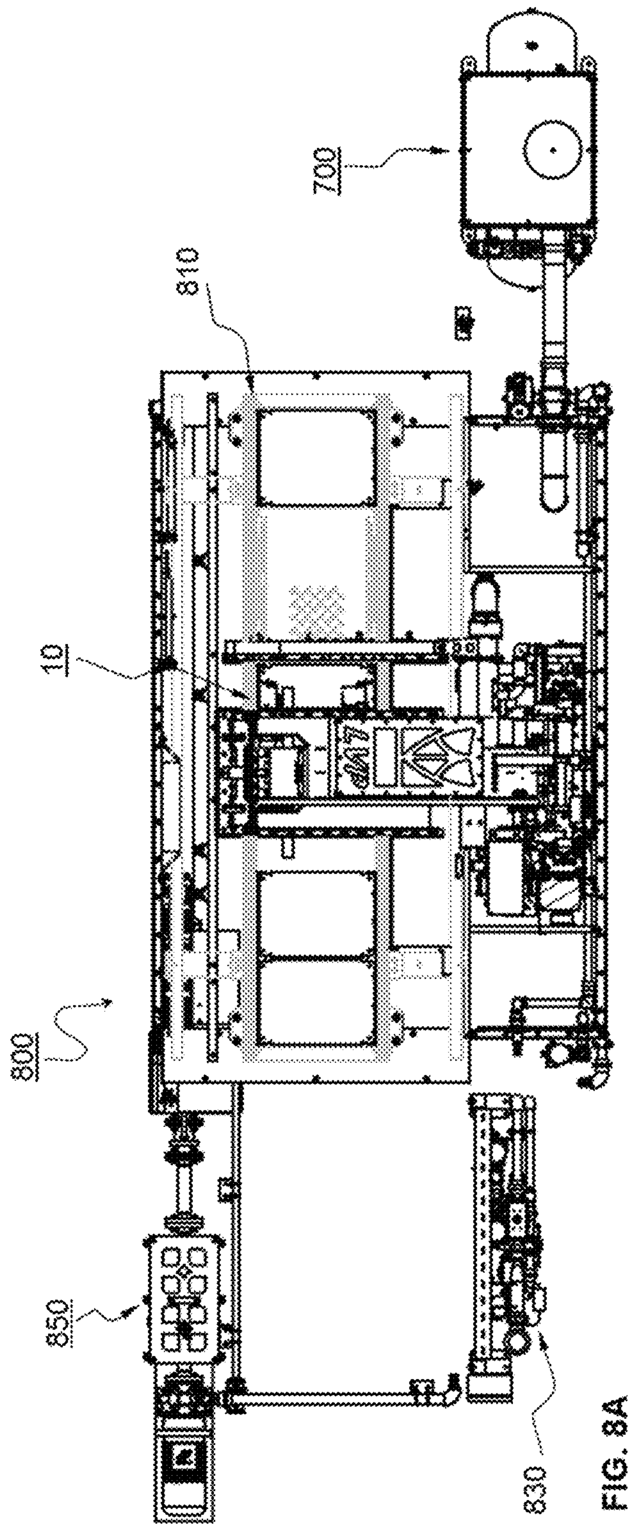
FIG. 8A is a top view of a container cleaning installation (800) according to a preferred embodiment of the present invention.
Figure 8B:
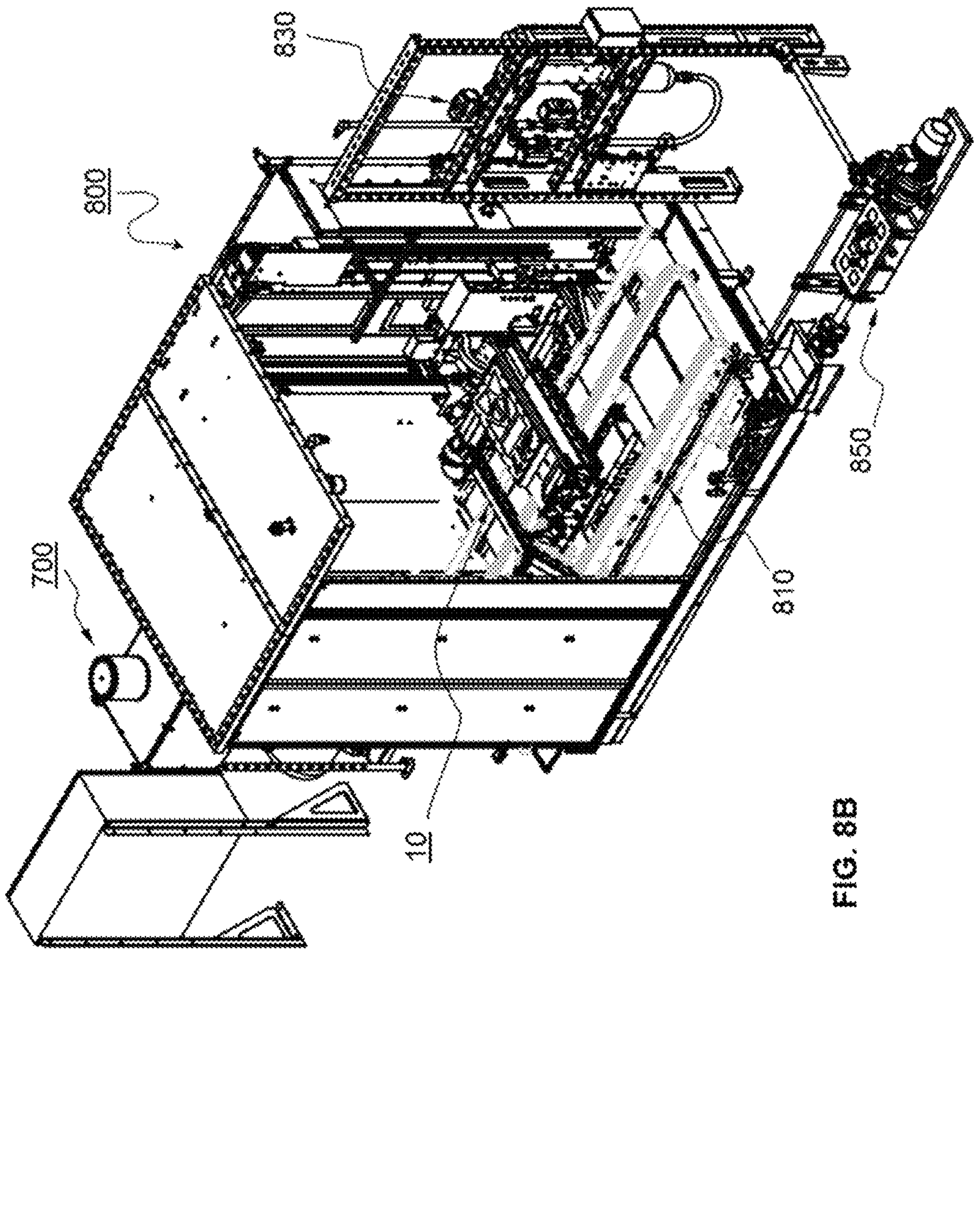
FIG. 8B is a front perspective view of container cleaning installation (800) according to a preferred embodiment of the present invention.

Example 2 is described with reference to FIGS. 8A and 8B, which show a preferred embodiment of a container cleaning installation (800) comprising a container cleaning arm (10), for instance the one described above in Example 1. The preferred embodiment of the container cleaning installation (800) further comprises a motorized drive for driving said cleaning arm's movement. The motorized drive is coupled to a proximate end of the cleaning arm (10). The container cleaning installation (800) further comprises a chain conveyor belt (810) having a plurality of mechanical stoppers.

Figure 8C:
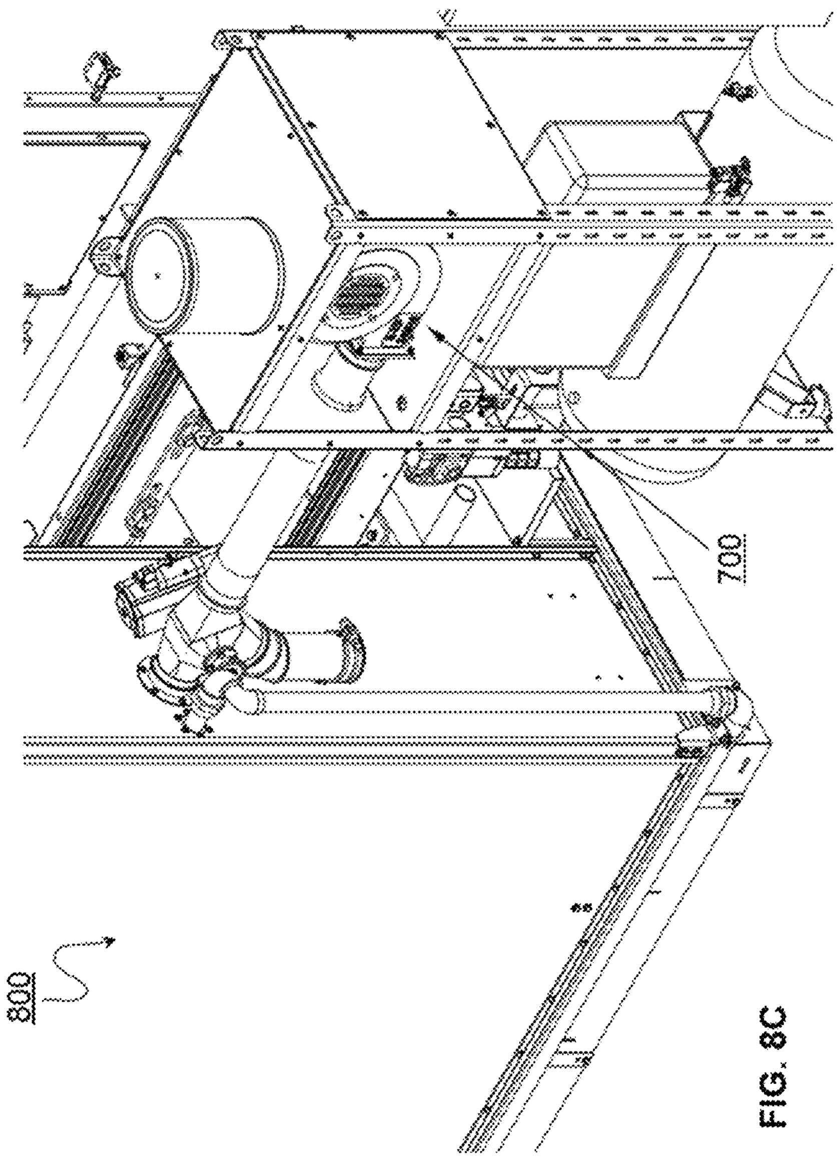
FIG. 8C is a rear perspective view of container cleaning installation (800) according to a preferred embodiment of the present invention.

The container cleaning installation (800) further comprises an air blower (700), which is connected to an air inlet of the cleaning arm (10). The air blower is better shown in FIG. 8C. In this exemplary embodiment, drying air from the blower is redirected using a two-way valve to a blind flange to reduce the air velocity without wearing down the turbine of the blower. The container cleaning installation (800) further comprises a water collecting and recycling system. The water is collected using a floor plate onto which the cleaning agent flows off from the cleaning container during the cleaning cycle. The collected water may then pass a sequence of water filtering and purifying devices. For example, a first filter may be provided for filtering coarse particles and large shipping debris, such as pieces of carton. The filtered water may then pass through a second filter filtering smaller particles, such as a candle filter. Lastly, the filtered water may be purified by means of an UV-light emitting device. The filtered and purified water may then be reused for the next cleaning cycle. If the amount of water in the cleaning installation (800) is insufficient, additional water may flow in from a water feed connected to the cleaning installation (800). Lastly, the container cleaning installation (800) comprises an enclosure, which encloses the cleaning arm.

Example 3: Cleaning Method

Figure 9A:
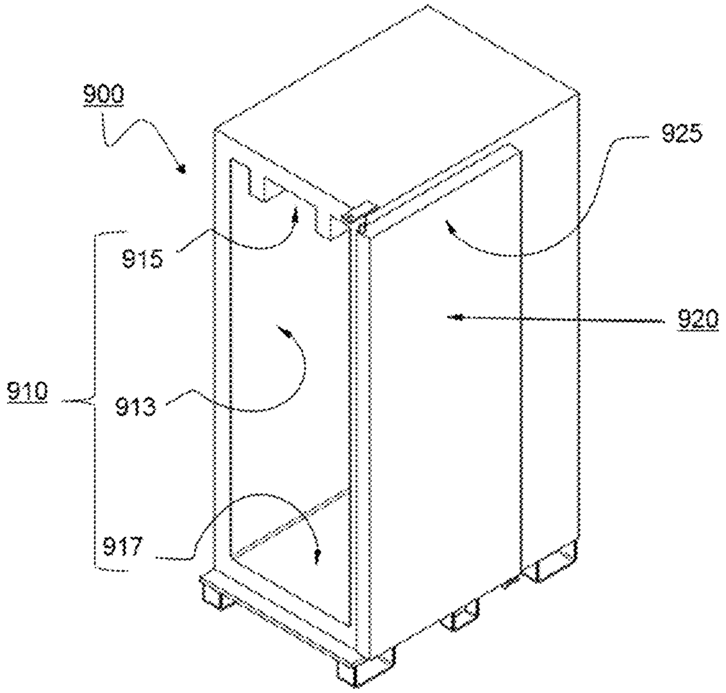
FIG. 9A is a perspective view of an exemplary (insulated) container (900) for transporting food, medical or pharmaceutical products.
Figure 9B:
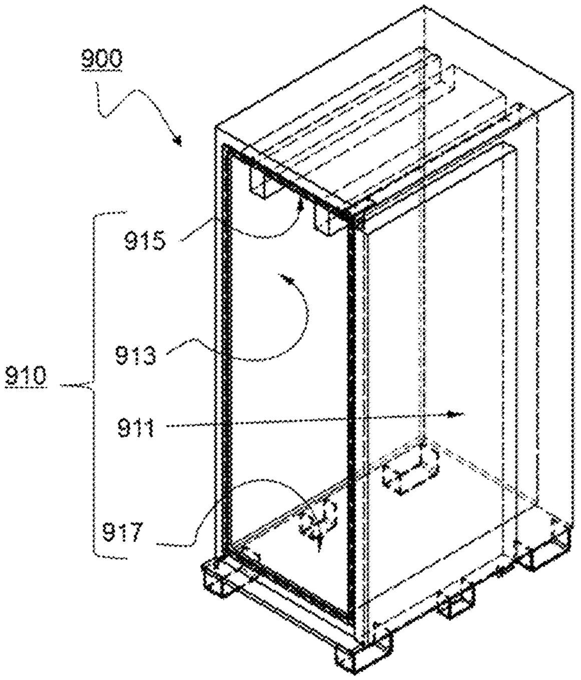
FIG. 9B is a cross-sectional view of an exemplary (insulated) container (900) for transporting food, medical or pharmaceutical products.

Example 3 is described with reference to FIG. 10, which shows an exemplary embodiment of a container cleaning installation (800) in a side view performing a cleaning cycle on a container (900). The container is better shown in FIGS. 9A and 9B. In particular, FIG. 9A is a perspective view of an exemplary container (900) for transporting food, medical or pharmaceutical products showing the container interior back surface (911), side surface (913), top surface (915), and bottom surface (917), and further also showing the container door interior surface (920) and top surface (925). FIG. 9B is a cross-sectional view of the same container showing the container interior back surface (911), side surface (913), top surface (915) and bottom surface (917).

Figure 10A:
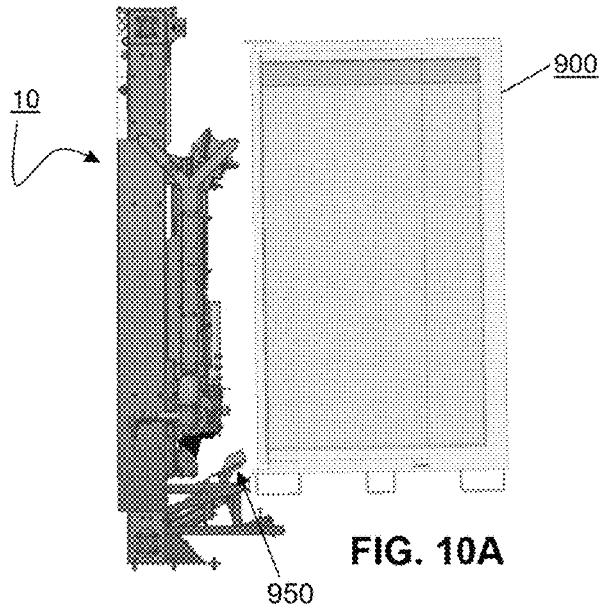
FIGS. 10A-P are a series of perspective side views illustrating an exemplary cleaning cycle performed by a cleaning arm (10) according to a preferred embodiment of the present invention.
Figure 10B:
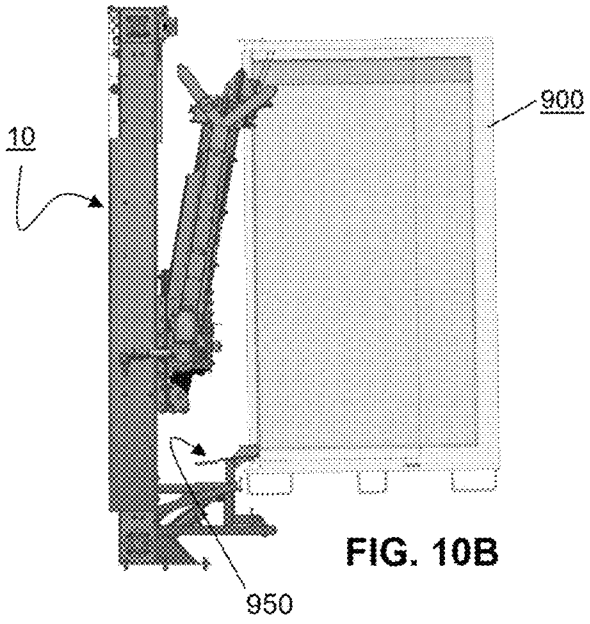
Figure 10C:
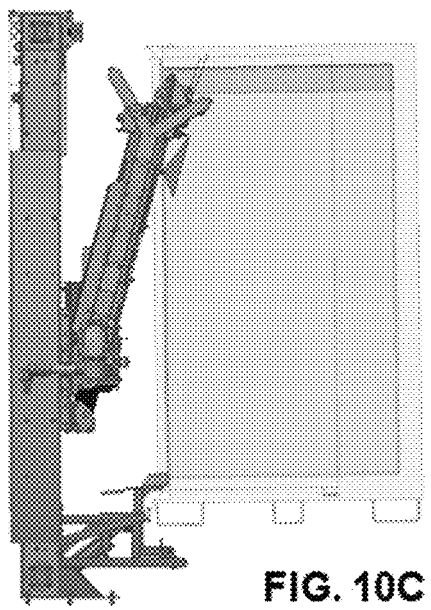
Figure 10D:
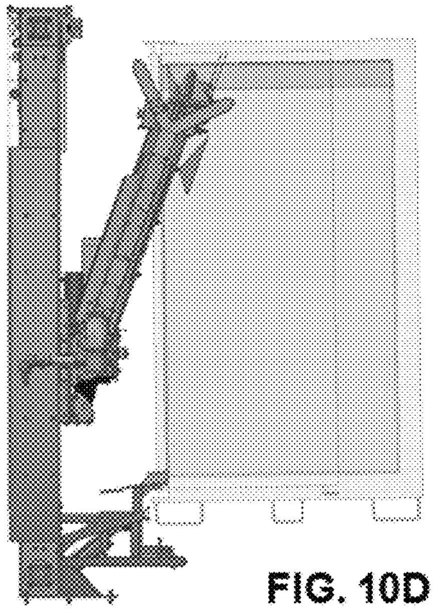
Figure 10E:
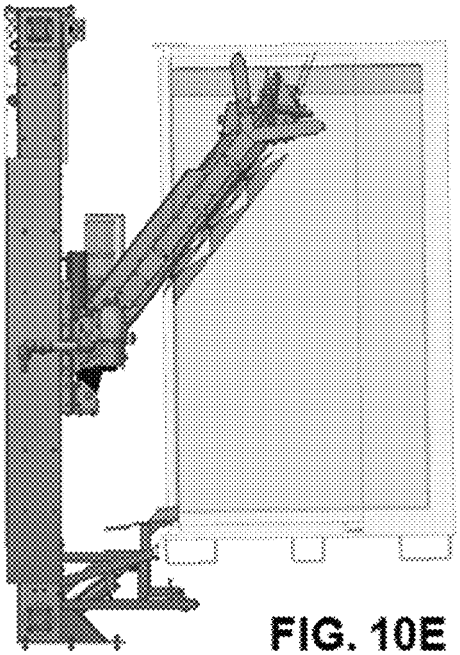
Figure 10F:
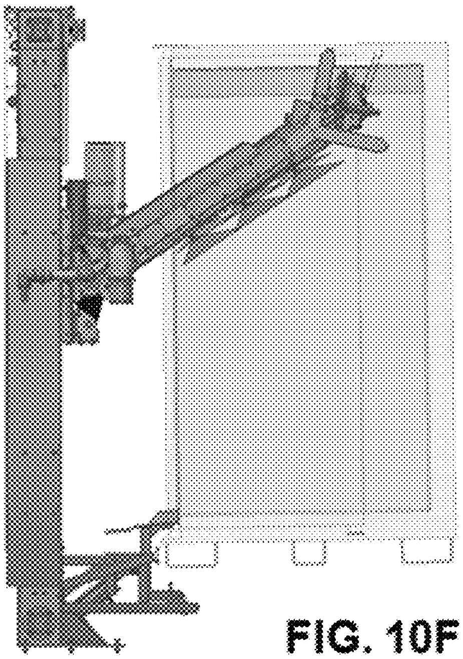
Figure 10G:
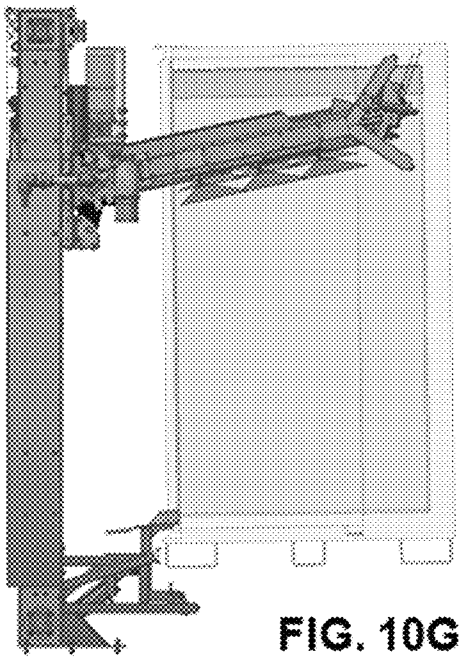
Figure 10H:
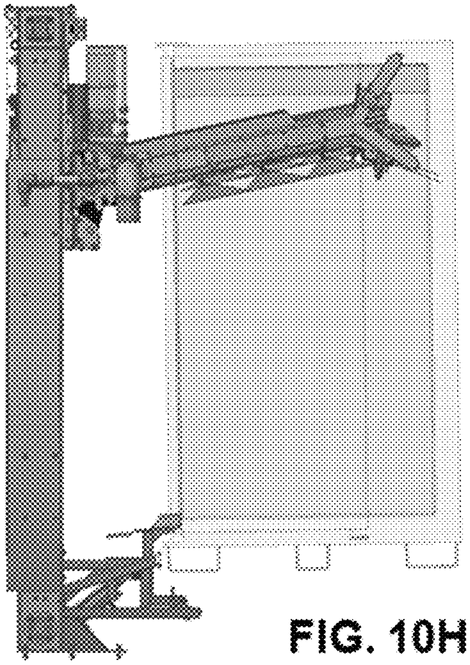
Figure 10I:
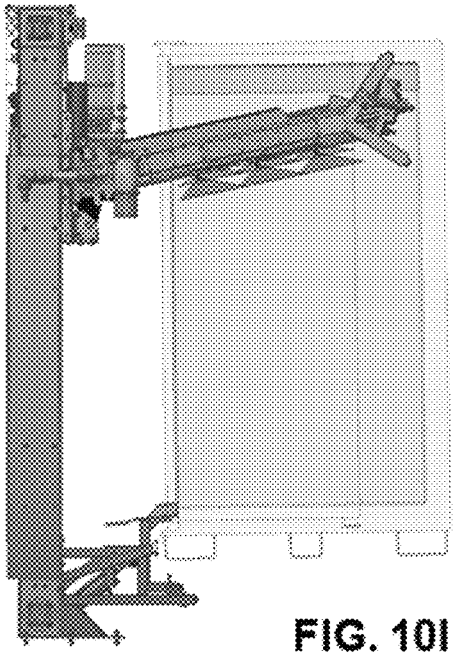
Figure 10J:
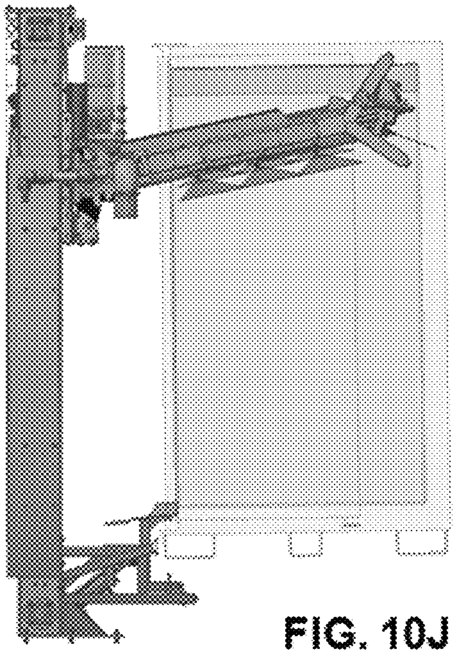
Figure 10K:
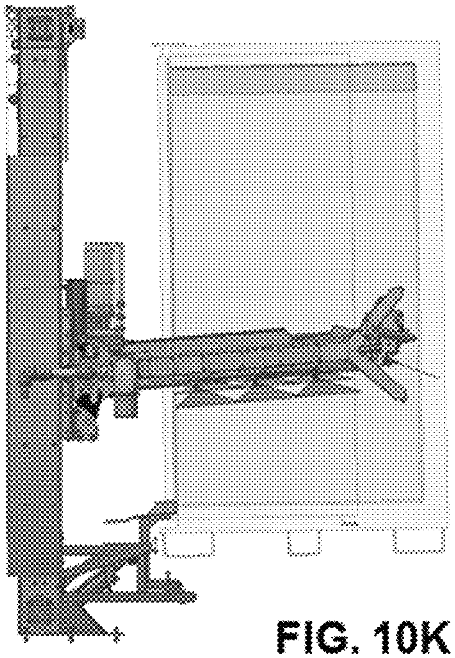
Figure 10L:
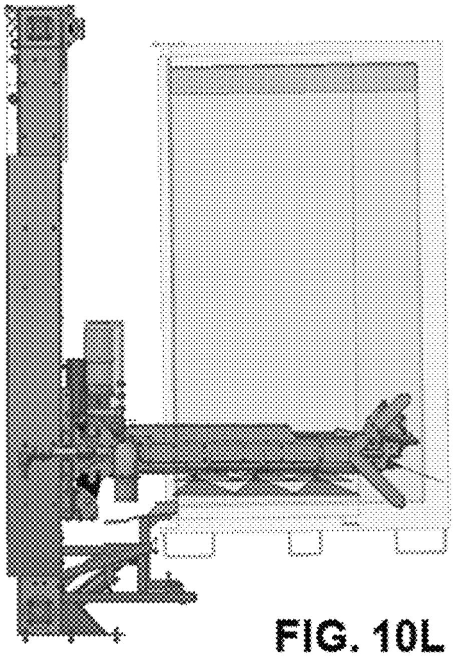
Figure 10M:
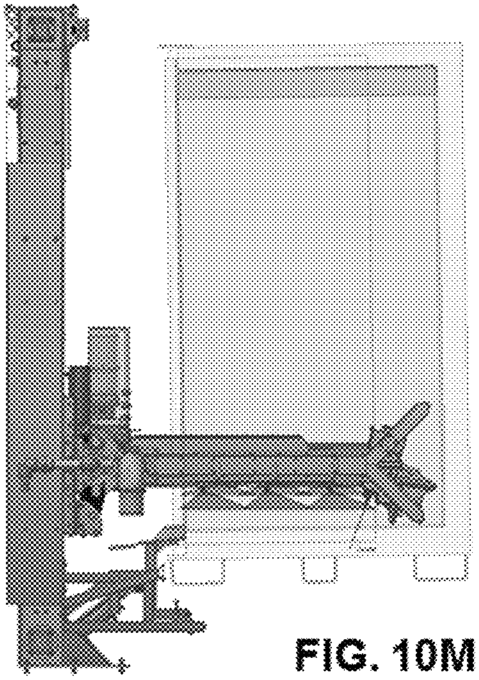
Figure 10N:
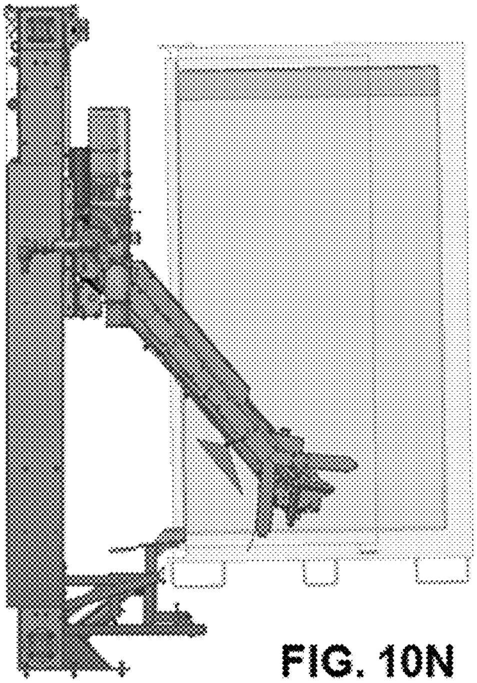
Figure 10O:
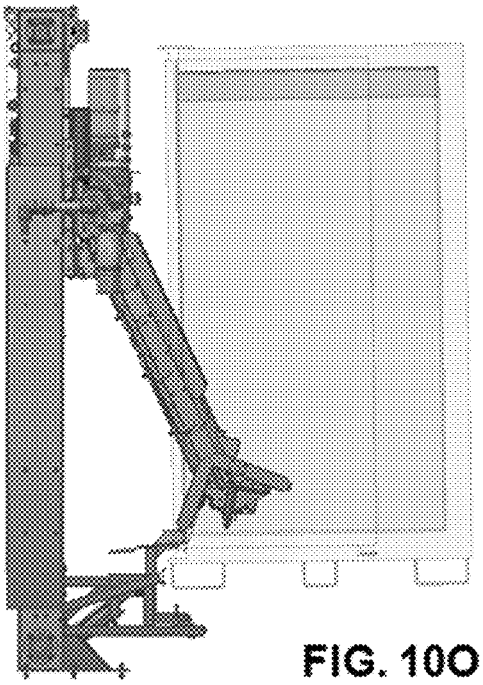
Figure 10P:
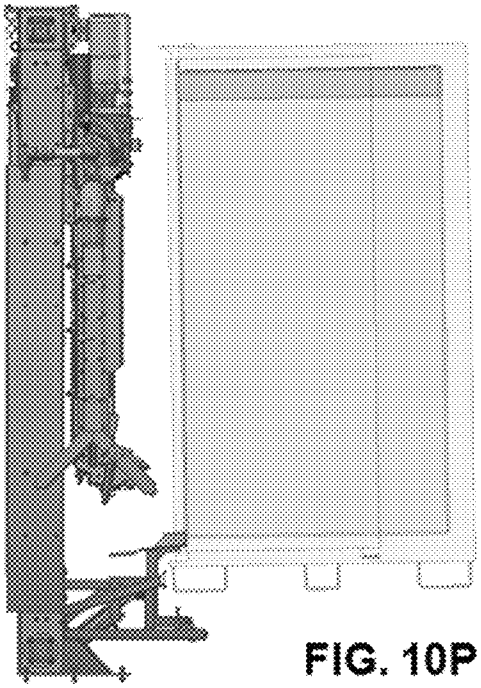

FIG. 10A: Before starting the cleaning cycle a container is provided in front of the container cleaning arm and arranged with the container door fully opened. The cleaning arm is arranged in an upright position (i.e. the cleaning arm is vertically oriented) with the rotatable head being positioned above the main body. FIG. 10B: A container cover (950) engages with the container to cover the container bottom and guide the flow of the cleaning agent away from the container interior. The cleaning cycle start with a forward tilting motion of the container cleaning arm. The second group of washing nozzles starts spraying the container interior top surface. FIG. 10C: The cleaning arm continues tilting forward while the fourth group of washing nozzles starts spraying the container interior side surfaces. FIG. 10D: The cleaning arm continues tilting forward while the sixth group of washing nozzles starts spraying the container door top surface. FIG. 10E: The cleaning arm continues tilting forward while the third group of washing nozzles starts spraying the container interior side surfaces and the fifth group of washing nozzles starts spraying the container door surface. FIG. 10F: The forward tilting motion of the cleaning arm continues until the rotatable head reaches the back end of the container. FIG. 10G: The cleaning arm reaches a near level position and the forward tilting motion is stopped. The cleaning arm is now fully inserted into the container interior and the sixth washing nozzle stops spraying. FIG. 10H: The rotatable head rotates over an approximately 90° angle such that the second group of washing nozzles can fully spray the container interior top-back corner. FIG. 10I: The rotatable head rotates back, and the second group of washing nozzles stops spraying. FIG. 10J: The first group of washing nozzles starts spraying the container interior back surface. FIG. 10K: The cleaning cycle continues with a downward motion of the cleaning arm. The first, third, fourth and fifth group of washing continue spraying while the cleaning arm moves downward. FIG. 10L: The downward motion of the cleaning arm continues until the cleaning arm reaches the bottom end of the container. The cleaning arm tilts further forward until the cleaning arm reaches a fully level position (i.e. the cleaning arm is horizontally oriented). FIG. 10M: The rotatable head rotates over an approximately 90° angle such that the first group of washing nozzles can fully spray the container interior bottom-back corner. FIG. 10N: The cleaning cycle continues with an upward movement of the cleaning arm while the cleaning arm starts with a backward tilting motion. The third and fifth groups of washing nozzles stop spraying, while the first group of washing nozzles sprays the container interior bottom surface. FIG. 10O: The backward tilting motion of the cleaning arm continues until the rotatable head reaches the front end of the container. FIG. 10P: The cleaning arm is now fully extracted from the container interior and all washing nozzles stop spraying. The cleaning cycle ends with the cleaning arm being in an upright position (i.e. the cleaning arm is vertically oriented) with the rotatable head positioned below the main body.

The invention claimed is:

1. A cleaning arm for cleaning a container comprising:

a main body and a rotatable head for cleaning a container interior surface;

the main body having a proximate end, which is configured for engaging with a motorized drive, and a distal end, which is rotatably coupled to the rotatable head;

the rotatable head comprising a first washing nozzle or group of washing nozzles, a first air knife dryer positioned adjacent to the first washing nozzle or group of washing nozzles; and the cleaning arm further comprising a fluid conduit for conveying cleaning agent to the first washing nozzle or group of washing nozzles, and an air conduit for delivering drying air to the first air knife dryer, wherein the fluid and air conduits are disposed within the cleaning arm; and a fluid collector for storing cleaning agent to be distributed to the first washing nozzle or group of washing nozzles; the fluid collector having an inlet for receiving cleaning agent and at least one outlet provided with a controllable valve, which is configured for sending cleaning agent to the first washing nozzle or group of washing nozzles; wherein the fluid collector is disposed within the cleaning arm.

2. The cleaning arm of claim 1, wherein the rotatable head comprises a second washing nozzle or group of washing nozzles and a second air knife dryer provided adjacent to the second washing nozzle or group of washing nozzles;

wherein the first washing nozzle or group of washing nozzles is disposed at an angle relative to the second washing nozzle or group of washing nozzles, such that a first surface area cleaned by the first washing nozzle or group of washing nozzles does not overlap with a second surface area cleaned by the second washing nozzle or group of washing nozzles.

3. The cleaning arm of claim 2, wherein the angle between the first washing nozzle or group of washing nozzles and the second washing nozzle or group of washing nozzles is at least 25° to at most 155°.

4. The cleaning arm of claim 2, wherein the main body comprises a third washing nozzle or group of washing nozzles, and wherein the third group of washing nozzles are arranged in a line with respect to each other along a longitudinal direction of the main body, and a third air knife dryer and a fourth air knife dryer provided on opposite sidewalls of the main body.

5. The cleaning arm of claim 4, wherein the main body comprises a fourth washing nozzle or group of washing nozzles provided near at least one corner at the distal end of the main body.

6. The cleaning arm of claim 5, further comprising an essentially L-shaped extension for cleaning a container door interior surface;

the L-shaped extension comprising an elongated body having a proximate end, which is attachable to the main body, and a distal end; and, the elongated body comprising a fifth washing nozzle or group of washing nozzles, and wherein the fifth group of washing nozzles are arranged in a line with respect to each other along a longitudinal direction of the elongated body, and a fifth air knife dryer provided on a sidewall of the elongated body.

7. The cleaning arm of claim 6, wherein the distal end of the elongated body is provided with two divergently arranged side members, a first side member and a second side member, forming an essentially Y-shaped extension for cleaning a container door interior top and side surfaces, the first side member comprising a sixth washing nozzle or group of washing nozzles provided near a terminal portion of the first side member, and a sixth air knife dryer provided on a sidewall of the first side member; and, the second side member comprising a seventh air knife dryer provided on a sidewall of the second side member.

8. The cleaning arm of claim 7, wherein the at least one outlet of the fluid collector is provided with the controllable valve and at least one further controllable valve, which is configured for selectively sending cleaning agent to a washing nozzle or washing nozzle group from the following list: the first washing nozzle or group of washing nozzles, the second washing nozzle or group of washing nozzles, the third washing nozzle or group of washing nozzles, the fourth washing nozzle or group of washing nozzles, the fifth washing nozzle or group of washing nozzles, and/or the sixth washing nozzle or group of washing nozzles, or a combination thereof.

9. The cleaning arm of claim 7, comprising a switching valve configured for selectively switching airflow between the sixth air knife dryer and the seventh air knife dryer by selectively blocking airflow to the sixth air knife dryer or the seventh air knife dryer.

10. The cleaning arm of claim 9, wherein the switching valve is operatively connected to a controllable valve, the controllable valve being configured for selectively sending cleaning agent to the sixth washing nozzle or group of washing nozzles, such that when the controllable valve sends a flow of cleaning agent to the sixth washing nozzle or group of washing nozzles, the controllable valve operates the switching valve to enable airflow to the sixth air knife dryer and block airflow to the seventh air knife dryer.

11. The cleaning arm of claim 4, comprising a shut-off valve configured for selectively shutting off the third air knife dryer and the fourth air knife dryer by blocking airflow into the third knife dryer and the fourth air knife dryer.

12. The cleaning arm of claim 4, wherein the main body comprising the third group of washing nozzles, and the washing nozzles of the third group of washing nozzles are provided on opposite sides of the main body.

13. The cleaning arm of claim 2, wherein the rotatable head comprising the second group of washing nozzles, and the washing nozzles of the second group of washing nozzles are arranged in a line.

14. The cleaning arm of claim 2, wherein the angle between the first air knife dryer and the second air knife dryer is at least 25° to at most 155°.

15. The cleaning arm of claim 1, wherein the rotatable head comprising the first group of washing nozzles, and the washing nozzles of the first group of washing nozzles are arranged in a line.

16. The cleaning arm of claim 1, wherein the fluid and air conduits are disposed completely within the cleaning arm.

17. A container cleaning installation for cleaning containers, comprising:

a cleaning arm comprising a main body and a rotatable head for cleaning a container interior surface;

the main body having a proximate end, which is configured for engaging with a motorized drive, and a distal end, which is rotatably coupled to the rotatable head;

the rotatable head comprising a first washing nozzle or group of washing nozzles and a first air knife dryer positioned adjacent to the first washing nozzle or group of washing nozzles; and the cleaning arm further comprising a fluid conduit for conveying cleaning agent to the first washing nozzle or group of washing nozzles, and an air conduit for delivering drying air to the first air knife dryer, wherein the fluid and air conduits are disposed at least partially within the cleaning arm; and, a fluid collector for storing cleaning agent to be distributed to the first washing nozzle or group of washing nozzles; the fluid collector having an inlet for receiving cleaning agent and at least one outlet provided with a controllable valve, which is configured for sending cleaning agent to the first washing nozzle or group of washing nozzles; wherein the fluid collector is disposed at least partially within the cleaning arm;

the motorized drive configured for engaging with the cleaning arm and driving the cleaning arm movement;

a water supply for providing cleaning agent to the cleaning arm; and, an air supply for providing drying air to the cleaning arm.

18. The container cleaning installation of claim 17, further comprising:

a chain conveyor belt for transporting a container to the cleaning arm;

at least one mechanical stopper for stopping the container at the cleaning arm;

a container cover for covering at least part of a container exterior surface;

a water collecting and recycling system, and a valve rack comprising a water supply valve for closing off the water supply.

19. The container cleaning installation of claim 17, further comprising a water collecting and recycling system.

20. The container cleaning installation of claim 17, wherein the air supply comprises an air blower.

* * * * *